US005696376A

United States Patent [19]

Doroshenko et al.

[11] Patent Number: 5,696,376

[45] Date of Patent: Dec. 9, 1997

[54] METHOD AND APPARATUS FOR ISOLATING IONS IN AN ION TRAP WITH INCREASED RESOLVING POWER

[75] Inventors: Vladimir M. Doroshenko, Reisterstown; Robert J. Cotter, Baltimore, both of Md.

[73] Assignee: The Johns Hopkins University, Baltimore, Md.

[21] Appl. No.: 650,411

[22] Filed: May 20, 1996

[51] Int. Cl.$^6$ .......................... B01D 59/44; H01J 49/00

[52] U.S. Cl. .......................... 250/292; 250/282

[58] Field of Search .......................... 250/292, 281, 250/282, 288

[56] References Cited

U.S. PATENT DOCUMENTS

| | | | |
|---|---|---|---|
| 2,882,410 | 4/1959 | Brobeck | 250/41.9 |
| 2,939,952 | 6/1960 | Paul et al. | 250/41.9 |
| 3,073,951 | 1/1963 | Burdg | 250/41.9 |
| 3,590,243 | 6/1971 | Perrin et al. | 250/419 S |
| 3,955,084 | 5/1976 | Giffin | 250/281 |
| 4,175,234 | 11/1979 | Hunt et al. | 250/427 |
| 4,298,795 | 11/1981 | Takeuchi et al. | 250/282 |
| 4,473,748 | 9/1984 | Konagai et al. | 250/299 |
| 4,540,884 | 9/1985 | Stafford et al. | 250/282 |
| 4,749,860 | 6/1988 | Kelley et al. | 250/282 |
| 4,761,545 | 8/1988 | Marshall et al. | 250/291 |
| 4,818,869 | 4/1989 | Weber-Grabau | 250/282 |
| 4,882,485 | 11/1989 | Duryea | 250/288 |
| 4,924,089 | 5/1990 | Caravatti | 250/290 |
| 4,931,639 | 6/1990 | McLafferty | 250/282 |
| 4,931,640 | 6/1990 | Marshall et al. | 250/291 |
| 4,945,234 | 7/1990 | Goodman et al. | 250/291 |
| 4,952,802 | 8/1990 | Duryea | 250/288 |
| 4,959,543 | 9/1990 | McIver et al. | 250/282 |
| 5,013,912 | 5/1991 | Guan et al. | 250/282 |
| 5,047,636 | 9/1991 | Farrar et al. | 250/292 |

(List continued on next page.)

OTHER PUBLICATIONS

Kaiser, Jr., R. E. et al., "Collisionally Activated Dissociation of Peptides Using a Quadrupole Ion–Trap Mass Spectrometer," *Rapid Commun. Mass Spectrom.*, vol. 4, pp. 30–33 (1990).

Gronowska, J. et al., "A Study of Relevant Parameters in Collisional–activation of Ions in the Ion–trap Mass Spectrometer," *Rapid Commun. Mass Spectrom.*, vol. 4, pp. 306–313 (1990).

(List continued on next page.)

*Primary Examiner*—Bruce Anderson

*Attorney, Agent, or Firm*—Kirk D. Houser; Arnold B. Silverman; Eckert Seamans Cherin & Mellott, LLC

[57] ABSTRACT

A method of operation of an ion trap mass spectrometer which isolates a first group of ions having a mass-to-charge ratio range is disclosed. The method includes producing ions from a plurality of atoms or molecules; trapping the ions in an ion trap by applying a trapping voltage to a ring electrode; applying an excitation voltage to a pair of end-cap electrodes; employing as the excitation voltage a first broadband excitation waveform and a second broadband excitation waveform, with the first waveform exciting the ions excluding substantially all of the first group and also excluding substantially all of a second group of ions having a range of mass-to-charge ratios about the first group's mass-to-charge ratio range, and the second waveform exciting the second group; applying the first waveform in order to eject the ions excluding substantially all of the first and second groups; and applying the second waveform in order to successively eject the second group of ions, according to the mass-to-charge ratios thereof, excluding substantially all of the first group of ions, thereby isolating the first group of ions. In another embodiment, the excitation voltage is a broadband excitation waveform having first, second, and third excitation portions, with the first and third portions exciting the ions excluding substantially all of the first group and also excluding substantially all of the second group, and the second portion exciting the second group. Associated apparatus is also disclosed.

60 Claims, 15 Drawing Sheets

U.S. PATENT DOCUMENTS

| | | | |
|---|---|---|---|
| 5,128,542 | 7/1992 | Yates et al. | 250/282 |
| 5,155,357 | 10/1992 | Hemond | 250/291 |
| 5,206,507 | 4/1993 | Kelley | 250/282 |
| 5,206,509 | 4/1993 | McLuckey et al. | 250/292 |
| 5,324,939 | 6/1994 | Louris et al. | 250/292 |
| 5,331,157 | 7/1994 | Franzen | 250/282 |
| 5,347,127 | 9/1994 | Franzen | 250/292 |
| 5,396,064 | 3/1995 | Wells | 250/292 |
| 5,399,857 | 3/1995 | Doroshenko et al. | 250/292 |
| 5,449,905 | 9/1995 | Hoekman et al. | 250/282 |
| 5,466,931 | 11/1995 | Kelley | 250/282 |
| 5,468,957 | 11/1995 | Franzen | 250/292 |

OTHER PUBLICATIONS

Schwartz, J. C. et al., "High Resolution Parent–ion Selection/Isolation Using A Quadrupole Ion–trap Mass Spectrometer," *Rapid Commun. Mass Spectrom.*, vol. 6, pp. 313–317 (1992).

Chen, L. et al., "Phase–Modulated Stored Waveform Inverse Fourier Transform Excitation for Trapped Ion Mass Spectrometry," *Anal. Chem.*, vol. 59, pp. 449–454 (1987).

Wang, T. L. et al., "Extension of Dynamic Range in Fourier Transform Ion Cyclotron Resonance Mass Spectrometry via Stored Waveform Inverse Fourier Transform Excitation," *Anal. Chem.*, vol. 58, pp. 2935–2938 (1986).

Soni, M.H. et al., "Selective Injection and Isolation of Ions in Quadrupole Ion Trap Mass Spectrometry Using Notched Waveforms Created Using the Inverse Fourier Transform," *Anal. Chem.*, vol. 66, pp. 2488–2496 (1994).

Garrett, A. W. et al., "Selective Injection of Laser Desorbed Ions into a Quadrupole Ion Trap with a Filtered Noise Field," *Rapid Commun. Mass Spectrom.*, vol. 8, pp. 174–178 (1994).

O'Connor, P. B. et al., "High–Resolution Ion Isolation with the Ion Cyclotron Resonance Capacitively Coupled Open Cell," *J. Am. Soc. Mass Spectrom.*, vol. 6, pp. 533–535 (1995).

Williams, J. D. et al., "Resonance Election Ion Trap Mass Spectrometry and Nonlinear Field Contributions: The Effect of Scan Direction on Mass Resolution," *Anal. Chem.*, vol. 66, pp. 725–729 (1994).

Doroshenko et al., "Linear Mass Calibration in the Quadrupole Ion–trap Mass Spectrometer," *Rapid Commun. Mass Spectrom.*, vol. 8, pp. 766–775 (1994).

Schubert, M. et al., "Exciting Waveform Generation for Ion Traps," *Proceedings of the 43rd Conference on Mass Spectrometry and Allied Topics*, Atlanta, Georgia, p. 1107, ASMS (1992).

Londry, F. A. et al., "Enhanced Mass Resolution in A Quadrupole Ion Trap," *Rapid Commun. Mass Spectrom.*, vol. 7, pp. 43–45 (1993).

Jennings, "Collision–Induced Decompositions of Aromatic Molecular Ions," *Int. J. Mass Spectrom. Ion Physics*, vol. 1, pp. 227–235 (1968).

Louris et al., "Instrumentation, Applications, and Energy Deposition in Quadrupole Ion–Trap Tandem Mass Spectrometry," *Anal. Chem.*, vol. 59, pp. 1677–1685 (1987).

Kaiser et al., "Operation of a Quadrupole Ion Trap Mass Spectrometer to Achieve High Mass/Charge Ratios," *Int. J. Mass Spectrom. Ion Processes*, vol. 106,. pp. 79–115 (1991).

Van Berkel et al., "Electrospray Ionization Combined with Ion Trap Mass Spectrometry," *Anal. Chem.*, vol. 62, pp. 1284–1295 (1990).

Cox et al., "Quadrupole Ion Trap Mass Spectrometry: Current Applications and Future Directions for Peptide Analysis," *Biol. Mass Spectrom.*, vol. 21, pp. 226–241 (1992).

Doroshenko et al., "Matrix–assisted Laser Desorption/Ionization inside a Quadrupole Ion–trap Detector Cell," *Rapid Commun. Mass Spectrom.*, vol. 6, pp. 753–757 (1992).

Chambers et al., "Matrix–Assisted Laser Desorption of Biological Molecules in the Quadrupole Ion Trap Mass Spectrometer," *Anal. Chem.*, vol. 65, pp. 14–20 (1993).

Jonscher et al., "Matrix–assisted Laser Desorption of Peptides and Proteins on a Quadrupole Ion Trap Mass Spectrometer," *Rapid Commun. Mass Spectrom.*, vol. 7, pp. 20–26 (1993).

Schwartz et al., "Matrix–assisted Laser Desorption of Peptides and Proteins Using a Quadrupole Ion Trap Mass Spectrometer," *Rapid Commun. Mass Spectrom.*, vol. 7, pp. 27–32 (1993).

Doroshenko et al., "A New Method of Trapping Ions Produced by Matrix–assisted Laser Desorption Ionization in a Quadrupole Ion Trap," *Rapid Commun. Mass Spectrom.*, vol. 7, pp. 822–827 (1993).

Kenny et al., "Simultaneous Isolation of Two Different m/z Ions in an Ion–trap Mass Spectrometer and their Tandem Mass Spectra Using Filtered–noise Fields," *Rapid Commun. Mass Spectrom.*, vol. 7, pp. 1086–1089 (1993).

Mordehai et al., "Computer–designed Waveform Technique for Reducing Chemical Noise in Atmospheric–pressure Ionization/Ion–trap Mass Spectrometry," *Rapid Commun. Mass Spectrom.*, vol. 7, pp. 1131–1135 (1993).

Guan et al., "Stored Waveform Inverse Fourier Transform Axial Excitation/Ejection for Quadrupole Ion Trap Mass Spectrometry," *Anal. Chem.*, vol. 65, pp. 1288–1294 (1993).

Arnold et al., "Extended Theoretical Considerations for Mass Resolution in the Resonance Ejection Mode of Quadrupole Ion Trap Mass Spectrometry," *J. Amer. Soc. for Mass Spectrom.*, vol. 5, pp. 676–688 (1994).

Goeringer et al., "Filtered Noise Field Signals for Mass Selective Accumulation of Externally Formed Ions in a Quadrupole Ion Trap," *Anal. Chem.*, vol. 66, pp. 313–318 (1994).

ASMS Abstract Entry, Doroshenko, V. M. et al., "Advanced SWIFT Technique for MALDI/Quadrupole Ion Trap Mass Spectrometer," 1 p. (1995).

Comisarow, Melvin B. et al., "Fourier Transform Ion Cyclotron Resonance Spectroscopy," *Chemical Physics Letters*, vol. 25, No. 2, pp. 282–283 (1974).

Marshall, Alan G. et al., "Tailored Excitation for Fourier Transform Ion Cyclotron Resonance Mass Spectrometry," *J. Am. Chem. Soc.*, vol. 107, No. 26, pp. 7893–7897 (1985).

Bracewell, Ronald N., *The Fourier Transform and Its Applications*, McGraw–Hill Book Company, pp. 189–218 (2d Ed, Revised 1986).

Doroshenko, V. M. et al., "High–Resolution Matrix–Assisted Laser Desorption/Ionization Mass Spectrometry of Biomolecules in a Quadrupole Ion Trap," *Laser Ablation: Mechanism and Applications—II, Second International Conference*, pp. 513–518, American Institute of Physics (1993).

March, R. E., "Ion Trap Mass Spectrometry," *Int. J. Mass Spectrom. Ion Processes*, vol. 118/119, pp. 71–135 (1992).

Julian, Jr., R. K. et al., "Broad–Band Excitation in the Quadrupole Ion Trap Mass Spectrometer Using Shaped Pulses Created with the Inverse Fourier Transform," *Anal. Chem.*, vol. 65, pp. 1827–1833 (1993).

913.552
908 910 912 914 916 918
Relative Intensity 913.556
908 910 912 914 916 918
Relative Intensity 913.553
908 910 912 914 916 918
Relative Intensity 913.454
908 910 912 914 916 918
Relative Intensity 914.396
908 910 912 914 916 918
Relative Intensity
600
800
1000
1200
1400
m/z

METHOD AND APPARATUS FOR ISOLATING IONS IN AN ION TRAP WITH INCREASED RESOLVING POWER

BACKGROUND OF THE INVENTION

1. Field of the Invention

The present invention relates to an improved method for operating an ion trap and, more specifically, it relates to a method for isolating ions of interest in the ion trap according to a mass-to-charge ratio thereof and, most specifically, is particularly advantageous in isolating either a single isotopic species or a plurality of ions within a predetermined mass-to-charge ratio range. The invention also relates to an improved mass spectrometer apparatus and, more specifically, it relates to such an apparatus for isolating ions of interest according to a mass-to-charge ratio thereof.

2. Description of the Prior Art

The use of mass spectrometers in determining the identity and quantity of constituent materials in a gaseous, liquid or solid specimen has long been known. Mass spectrometers or mass filters typically use the ratio of the mass of an ion to its charge, m/z, for analyzing and separating ions. The ion mass m is typically expressed in atomic mass units or Daltons (Da) and the ion charge z is the charge on the ion in terms of the number of electron charges e.

It is known, in connection with mass spectrometer systems, to analyze a specimen under vacuum through conversion of the molecules into an ionic form, separating the ions according to their m/z ratio, and permitting the ions to bombard a detector. See, generally, U.S. Pat. Nos. 2,882,410; 3,073,951; 3,590,243; 3,955,084; 4,175,234; 4,298,795; 4,473,748; and 5,155,357. See, also, U.S. Pat. Nos. 4,882,485; and 4,952,802.

It is known to use a mass spectrometer for mass analysis of large biological molecules and for tandem mass spectral measurements to provide structural and sequential information about peptides and other biopolymers. Known ionizers contain an ionizer inlet assembly wherein the specimen to be analyzed is received, a high vacuum chamber which cooperates with the ionizer inlet assembly, and an analyzer assembly which is disposed within the high vacuum chamber and adapted to receive ions from the ionizer. Detector means are employed in making a determination as to the constituent components of the specimen employing the mass-to-charge ratio as a distinguishing characteristic. By one of a variety of known methods, such as electron impact (EI), the molecules of a gaseous specimen contained in the ionizer are converted into ions for subsequent analysis.

It is also known to use desorption methods for ionizing large molecules. Such methods include secondary ion mass spectrometry, fast-atom bombardment, electrospray ionization (ESI) in which ions are evaporated from solutions, laser desorption, and matrix-assisted laser desorption/ionization (MALDI). In the MALDI desorption method, biomolecules to be analyzed are recrystallized in a solid matrix of a low mass chromophore. Following absorption of the laser radiation by the matrix, ionization of the analyte molecules occurs as a result of desorption and subsequent charge exchange processes. See Doroshenko, V. M. et al., "High-Resolution Matrix-Assisted Laser Desorption/Ionization Mass Spectrometry of Biomolecules in a Quadrupole Ion Trap," *Laser Ablation: Mechanisms and Applications-II, Second International Conference*, pp. 513–18, American Institute of Physics (1993).

Known mass analyzers come in a variety of types, including magnetic field (B), combined electrical and magnetic field or double-focusing instruments (EB and BE), quadrupole electric field (Q), and time-of-flight (TOF) analyzers. In addition, two or more analyzers may be combined in a single instrument to produce tandem (MS/MS or MS/MS/MS, for example) or hybrid mass spectrometers such as, for example, triple analyzers (EBE), four sector mass spectrometers (EBEB or BEEB), triple quadrupoles (QqQ) and other hybrids (e.g., EBqQ). Such known tandem and hybrid instruments require the use of additional mass analyzers. For example, in a triple quadrupole, a first quadrupole is used as a mass filter to select ions of a given mass, a second quadrupole is used as a collision chamber for fragmenting the selected ions, and a third quadrupole is used for mass analyzing the fragmented ions.

Ion traps are capable of storing one or more kinds of ions for relatively long periods of time. In contrast to the tandem and hybrid instruments, the ion trap separates successive reaction steps in time rather than in space.

Ion isolation is a process of removal of ions from an ion trap except for ions of interest. Isolation of precursor ions is used in tandem experiments to increase the signal-to-noise ratio for fragment ions in MS/MS spectra. Such experiments include formation of ions from a sample, trapping ions inside the ion trap, isolation of ions of interest, fragmentation, and recording of the fragment ion mass spectrum. Ion isolation is an important stage in this sequence because a variety of ions, such as matrix ions, are normally produced during the ionization of the sample. Such variety of ions forms a noisy chemical background which decreases the signal-to-noise ratio of the ion signal used in recording the mass spectrum. Ion isolation techniques, or ion selection methods, isolate ions of interest and, hence, increase the signal-to-noise ratio of the ion signal.

Another application of ion isolation methods, specific for ion traps which normally cannot store more than about $10^5$–$10^6$ ions, is a mass selective ion accumulation method. This method is utilized to increase the dynamic range of the ion trap by removal of unwanted ions from the trap during the introduction of ions into the trap. See March, R. E., "Ion Trap Mass Spectrometry," *Int. J. Mass Spectrom. Ion Processes*, Vol. 118/119, pp. 71–135 (1992).

An ion isolation technique, based on a broadband excitation of ions, is normally used in mass selective accumulation methods. See Julian, Jr., R. K. et al., "Broad-Band Excitation in the Quadrupole Ion Trap Mass Spectrometer Using Shaped Pulses Created with the Inverse Fourier Transform," *Anal. Chem.*, Vol. 65, pp. 1827–33 (1993).

One method for the isolation of precursor ions generally involves setting the direct current (DC) and radio frequency (RF) voltages in order that ions of lower and higher masses are simultaneously ejected near an apex of an ion stability diagram. See U.S. Pat. No. 4,818,869. Because this method does not permit unit mass isolation, the entire isotopic ion cluster is used for collision-induced dissociation (CID) experiments. See Kaiser, Jr., R. E. et al., "Collisionally Activated Dissociation of Peptides Using a Quadrupole Ion-Trap Mass Spectrometer," *Rapid Commun. Mass Spectrom.*, Vol. 4, pp. 30–33 (1990).

An alternative approach involves ramping of the DC and RF voltages for the removal of unwanted lower and higher mass ions in two consecutive stages. See Gronowska, J. et al., "A Study of Relevant Parameters in Collisional-activation of Ions in the Ion-trap Mass Spectrometer," *Rapid Commun. Mass Spectrom.*, Vol. 4, pp. 306–13 (1990).

Axial resonance ejection is also widely used for ion isolation. The scan ejection technique, which involves RF scans only in the resonance ejection mode, is used for isolation of isotopic ion clusters and, at slower scan rates, unit mass selection. See U.S. Pat. No. 4,749,860; and Schwartz, J. C. et al., "High Resolution Parention Selection/Isolation Using A Quadrupole Ion-trap Mass Spectrometer," *Rapid Commun. Mass Spectrom.*, Vol. 6, pp. 313–17 (1992).

In all these methods, complicated procedures are used for ion isolation which often require preliminary experiments to determine operational parameters at which the losses of ions of interest are minimal. Such losses become especially significant for smaller mass isolation ranges.

Another approach involves the use of a broadband excitation technique, in which many excitation frequencies are present in the excitation signal spectrum, for removal of unwanted ions from the ion trap. This method is typically used for ion excitation and isolation in Fourier transform mass spectrometers (FTMS). See Chen, L. et al., "Phase-Modulated Stored Waveform Inverse Fourier Transform Excitation for Trapped Ion Mass Spectrometry," *Anal. Chem.*, Vol. 59, pp. 449–54 (1987).

The inverse Fourier transform technique is normally used for designing waveforms of a desired excitation spectrum in which spectral Fourier components are selectively weighted in the frequency domain before application of the inverse Fourier transform. This stored waveform inverse Fourier transform (SWIFT) method may be improved by the use of a special type of nonlinear modulation of the initial phase of the spectral Fourier components to produce an excitation signal of reduced dynamic range in order that low-voltage waveform generators may be utilized. See U.S. Pat. Nos. 4,761,545; and 5,331,157.

It is also known to employ a phase-unmodulated SWIFT waveform to simultaneously eject ions from a trapping cell. See Wang, T. L. et al., "Extension of Dynamic Range in Fourier Transform Ion Cyclotron Resonance Mass Spectrometry via Stored Waveform Inverse Fourier Transform Excitation," *Anal. Chem.*, Vol. 58, pp. 2935–38 (1986).

In a quadrupole ion trap, the broadband excitation technique has been employed for ejection of unwanted ions. See U.S. Pat. No. 5,324,939.

Also, the SWIFT method has been applied for mass selective ion injection, ion isolation, and CID. See Soni, M. H. et al., "Selective Injection and Isolation of Ions in Quadrupole Ion Trap Mass Spectrometry Using Notched Waveforms Created Using the Inverse Fourier Transform," *Anal. Chem.*, Vol. 66, pp. 2488–96 (1994).

Another broadband excitation technique, known as filtered noise field (FNF), provides simultaneous isolation of two different ions. See U.S. Pat. Nos. 5,206,507; and 5,466,931.

This and other SWIFT-related techniques are used for increasing ion trap sensitivity via mass selective accumulation of analyte ions in the trap with both continuous and pulsed ion sources. See Garrett, A. W. et al., "Selective Injection of Laser Desorbed Ions into a Quadrupole Ion Trap with a Filtered Noise Field," *Rapid Commun. Mass Spectrom.*, Vol. 8, pp. 174–78 (1994).

It is known to employ broadband excitation waveforms in which frequency components are relatively uniform over the entire time-domain. See U.S. Pat. Nos. 5,206,507; and 5,324,939. It is also known to use broadband excitation waveforms designed with functions that modulate the phases of various frequency components in a nonlinear manner, such as with a quadratic function. See U.S. Pat. Nos. 4,761,545; and 5,206,507.

The frequency spectrum of a broadband excitation waveform usually consists of equidistant lines of equal intensities. The flexibility and strength of SWIFT and related techniques involve the use of an inverse Fourier transform to quickly change this spectrum (e.g., by making notches therein). In the FNF method, a broadband noise waveform is designed without any notches and, then, notches are made by filtering the broadband waveform in a notch filter. The resulting signal may be used to provide mass specific ion excitation.

The appearance of the resulting signal in the time domain is determined not only by the distribution of line intensities in the frequency domain, but also by the initial phase relations between them determined by the initial phase modulation function. Normally, the phase modulation function is determined by the application for which the broadband waveform is designed. Typically, the final waveform is designed to have a reduced or minimized dynamic range. For example, in the case where a flat excitation energy over the spectrum is required, quadratic phase modulation gives a waveform with a uniformly distributed energy in the time domain. See Chen, L. et al., *Anal. Chem.*, Vol. 59, pp. 449–54 (1987).

Despite the successful application of broadband excitation methods for isolation of ions in quadrupole ion traps, they are still far from a goal of unit mass selection. This is contrasted with a high resolution of about 29,000 for ion isolation at m/z 969 achieved in the FTMS. Such difference is due to the presence of helium buffer gas in the quadruple ion trap at a relatively high pressure of about 1 mTorr. Collisions with helium atoms broaden the frequency range at which ions may be excited. See O'Connor, P. B. et al., "High-Resolution Ion Isolation with the Ion Cyclotron Resonance Capacitively Coupled Open Cell," *J. Am. Soc. Mass Spectrom.*, Vol. 6, pp. 533—35 (1995).

The shift of ion resonance frequencies due to the presence of a high order RF field also prevents fine ion selection. See Williams, J. D. et al., "Resonance Election Ion Trap Mass Spectrometry and Nonlinear Field Contributions: The Effect of Scan Direction on Mass Resolution," *Anal. Chem.*, Vol. 66, pp. 725–729 (1994). This suggests that the process of ion isolation in quadrupole ion traps should be viewed differently from that in the FTMS.

An alternative approach to unit mass ion isolation has been considered where single isotopic species are selectively activated and fragmented without preliminary unit mass isolation using resonance excitation. This method allows a high-performance CID in an ion trap which is characterized by unit mass selection of precursor ions, high mass resolution, and accurate mass assignment of product ions. This may normally be achieved only on relatively expensive four-sector and FTMS instruments. However, resonance excitation of a single isotopic species is not a simple procedure and may result in additional lines in the product spectra if the excitation frequency is not precisely tuned.

Other broadband excitation waveforms for use in quadrupole ion traps are designed with alternative magnitudes of the frequency components in the frequency domain. Quadratic phase modulation dramatically reduces the maximum time domain signal and makes the design of the signal generator easier. More complicated algorithms for determination of the phase modulation function have been developed to reduce the dynamic range of the excitation signal in the time domain if the magnitudes of the Fourier components in the frequency domain are not equal. See U.S. Pat. Nos. 4,945,234; and 5,013,912.

Random phase modulation may also be used to produce a uniformly distributed noise signal. See Schubert, M. et al., "Exciting Waveform Generation for Ion Traps," *Proceedings of the 43rd Conference on Mass Spectrometry and Allied Topics*, Atlanta, Ga., p. 1107, ASMS (1992).

The SWIFT method for use in ion traps was adapted from the FTMS almost without modification, although the application goals of this technique are different from that of the FTMS. In the FTMS, SWIFT signals are used for ejection of unwanted ions and excitation of the remaining ions for CID or detection. Ion detection from the detected ion signal requires flatness of the excitation energy over the spectrum. Reduced dynamic range in the time domain is also required for precise generation of the waveform. However, it is believed that because the SWIFT method has not been used for ion detection in the ion trap, spectral energy flatness is not critical.

A property of commercially available ion traps, for example, is a shift of resonance frequencies of ions with increasing oscillation amplitude due to the nonlinear field contribution. See Williams, J. D. et al., *Anal. Chem.*, Vol. 66, pp. 725–729 (1994). Such property of commercially available ion traps is not believed to be known in connection with the application of SWIFT methods.

The presence of a buffer gas at high pressure of about 1 mTorr is also a unique feature of an ion trap which, nevertheless, does not prevent achieving high mass resolution in the FTMS. See Londry, F. A. et al., "Enhanced Mass Resolution in A Quadrupole Ion Trap," *Rapid Commun. Mass Spectrom.*, Vol. 7, pp. 43–45 (1993). Nevertheless, the buffer gas may hinder resolving power in an ion isolation experiment in the ion trap.

For these reasons, there remains a very real and substantial need for an improved ion trap apparatus and method of operation thereof. In particular, there is a very real and substantial need for an ion trap with increased resolving power to obtain a unit resolution for the isolation of ions over a relatively wide mass range and, more particularly, for amino acid sequencing of peptides in which fragments may differ by only one mass unit.

SUMMARY OF THE INVENTION

The present invention has met this need by providing an improved method of operation of an ion trap. This method, which isolates a first group of ions having at least one mass-to-charge ratio in the ion trap, includes producing ions from a plurality of atoms or molecules; trapping the ions in the ion trap by applying a trapping voltage to a ring electrode; applying an excitation voltage to a pair of end-cap electrodes; employing as the excitation voltage a first excitation waveform and a second excitation waveform, with the first excitation waveform exciting the ions excluding substantially all of the first group of ions and also excluding substantially all of a second group of ions having a range of mass-to-charge ratios about the mass-to-charge ratio of the first group of ions, and the second excitation waveform exciting the second group of ions; applying the first excitation waveform in order to eject the ions excluding substantially all of the first and second groups of ions; and applying the second excitation waveform in order to successively eject the second group of ions, according to the mass-to-charge ratios thereof, excluding substantially all of the first group of ions, thereby isolating the first group of ions in the ion trap.

The present invention also provides an improved method, which isolates a first group of ions having at least one mass-to-charge ratio in an ion trap, including producing ions from a plurality of atoms or molecules; trapping the ions in the ion trap by applying a trapping voltage to a ring electrode; applying an excitation voltage to a pair of end-cap electrodes; employing as the excitation voltage a broadband excitation waveform having first, second, and third excitation portions, with the first and third excitation portions exciting the ions excluding substantially all of the first group of ions and also excluding substantially all of a second group of ions having a range of mass-to-charge ratios about the mass-to-charge ratio of the first group of ions, and the second excitation portion exciting the second group of ions; applying the first and third excitation portions in order to eject the ions excluding substantially all of the first and second groups of ions; and applying the second excitation portion in order to sequentially eject the ions excluding substantially all of the first group of ions, thereby isolating the first group of ions in the ion trap.

The present invention further provides an improved ion trap mass spectrometer apparatus including ionizing means for producing ions from a plurality of atoms or molecules; trapping means for trapping the produced ions; separating means, for separating the trapped ions according to a ratio of mass-to-charge thereof, including a ring electrode and a pair of end-cap electrodes; and control means having applying means, for applying a trapping voltage to the ring electrode and for applying an excitation voltage to the end-cap electrodes, including means for applying the excitation voltage as at least one excitation waveform having at least two excitation portions, with a first excitation portion exciting the ions excluding substantially all of a first group of ions having at least one mass-to-charge ratio and also excluding substantially all of a second group of ions having a range of mass-to-charge ratios about the mass-to-charge ratio of the first group of ions in order to eject the ions excluding substantially all of the first and second groups of ions, and a second excitation portion exciting the second group of ions in order to successively eject the second group of ions, according to the mass-to-charge ratios thereof, excluding substantially all of the first group of ions, thereby isolating the first group of ions in the trapping means.

The present invention still further provides an improved ion trap mass spectrometer apparatus including ionizing means for producing ions from a plurality of atoms or molecules; trapping means for trapping the produced ions; separating means, for separating the trapped ions according to a ratio of mass-to-charge thereof, including a ring electrode and a pair of end-cap electrodes; and applying means, for applying a trapping voltage to the ring electrode and for applying an excitation voltage to the end-cap electrodes, including means for applying a first excitation waveform and means for applying a second excitation waveform, with the first excitation waveform exciting the ions excluding substantially all of a first group of ions having at least one mass-to-charge ratio and also excluding substantially all of a second group of ions having a range of mass-to-charge ratios about the mass-to-charge ratio of the first group of ions in order to eject the ions excluding substantially all of the first and second groups of ions, and the second excitation waveform exciting the second group of ions in order to successively eject the second group of ions, according to the mass-to-charge ratios thereof, excluding substantially all of the first group of ions, thereby isolating the first group of ions in the trapping means.

The present invention also provides an improved ion trap mass spectrometer apparatus including ionizing means for producing ions from a plurality of atoms or molecules; trapping means for trapping the produced ions; separating means, for separating the trapped ions according to a ratio of mass-to-charge thereof, including a ring electrode and a pair of end-cap electrodes; and applying means, for applying a trapping voltage to the ring electrode and for applying an excitation voltage to the end-cap electrodes, including means for applying the excitation voltage as a broadband excitation waveform having first, second, and third excitation portions, with the first and third excitation portions exciting the ions excluding substantially all of a first group of ions having at least one mass-to-charge ratio and also excluding substantially all of a second group of ions having a range of mass-to-charge ratios about the mass-to-charge ratio of the first group of ions in order to eject the ions excluding substantially all of the first and second groups of ions, and the second excitation portion exciting the second group of ions in order to sequentially eject the ions excluding substantially all of the first group of ions, thereby isolating the first group of ions in the trapping means.

A preferred refinement includes employing broadband excitation waveforms as the first and second excitation waveforms. In a further refinement, the second excitation waveform includes at least two excitation portions during which ions of different mass-to-charge ratios are successively excited. As a still further refinement, the second excitation waveform includes a gap between the two excitation portions with a time of duration at least about equal to a time of relaxation of kinetic energy associated with collisions of ions with the buffer gas molecules.

Preferably, to achieve fine isolation of the first group of ions, the second excitation waveform is designed to have an as small as possible rate of change of a mass-to-charge ratio of ejected ions determined by the mass-to-charge ratio range of the second group of ions and the duration of the second excitation waveform. A first rate of change of a mass-to-charge ratio of ions ejected from the ion trap is controlled with the first excitation waveform, and a second smaller rate of change of the mass-to-charge ratio of ejected ions is controlled with the second excitation waveform. A plurality of times ($t_i$) of effective action of a plurality of discrete Fourier components having a frequency ($f_i$) in the time domain of the excitation waveforms are preferably employed in order to successively excite ions, excluding at least substantially all of the first group of ions, according to a mass-to-charge ratio of the excited ions with a predetermined rate of change of such mass-to-charge ratio during the duration of the excitation waveforms. A phase $\phi_i$ of a subsequent discrete Fourier component of frequency $f_i$ is determined as a sum of the phase $\phi_{i-1}$ of a previous discrete Fourier component of frequency $f_{i-1}$ plus:

$$2\pi t_i(f_i - f_{i-1})$$

It is an object of the present invention to provide an improved method of operating an ion trap in which ions are isolated with increased resolving power with respect to known prior art methods.

It is also an object of the present invention to provide such an ion trap in which either a single isotopic species or a plurality of ions within a predetermined mass-to-charge ratio range are isolated as ions of interest.

It is further an object of the present invention to provide such an ion trap in which a single isotopic species may be collisionally dissociated to provide fragment mass spectra in which the ions are also monoisotopic.

These and other objects of the invention will be more fully understood from the following detailed description of the invention on reference to the illustrations appended hereto.

DESCRIPTION OF THE PREFERRED EMBODIMENTS

As employed herein, the term "ions" shall expressly include, but not be limited to electrically charged particles formed from either atoms or molecules by extraction or attachment of electrons, protons or other charged species.

Figure 1:
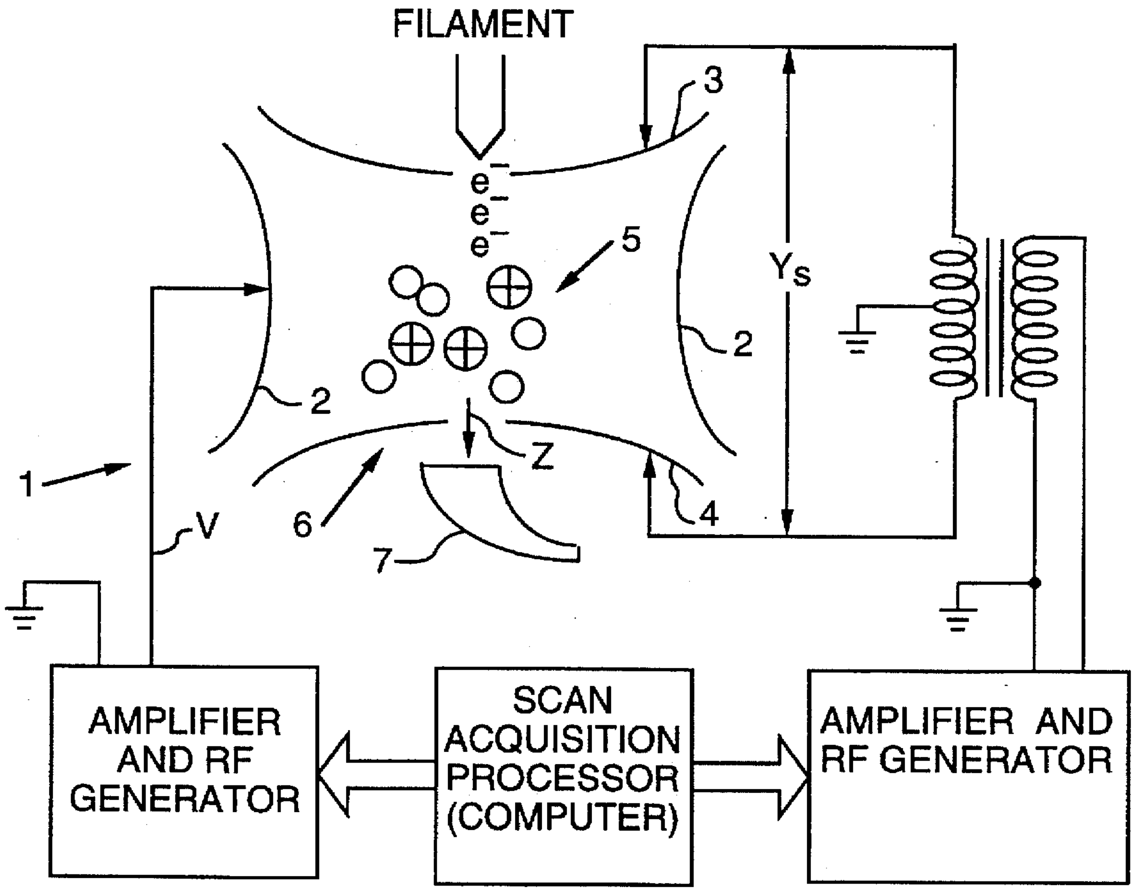
FIG. 1 PRIOR ART
FIG. 1 is a block diagram of a known quadrupole ion trap mass spectrometer having an AC voltage applied to a ring electrode, an AC voltage applied to a pair of end-cap electrodes, and an associated system.

Referring to FIG. 1, a known design of a quadrupole ion trap mass spectrometer 1 consists of a central, hyperbolic cross-section, ring electrode 2 located between two hyperbolic end-cap electrodes 3,4. See, for example, U.S. Pat. No. 4,749,860. In a known ionization method, ions 5 are trapped and confined inside an ion trap 6 by applying a radio frequency (RF) trapping voltage V on the ring electrode 2, and excited by applying a low amplitude bipolar RF excitation voltage $v_s$ between the end-cap electrodes 3,4. The ions 5, of different m/z ratios, are trapped simultaneously.

Figure 2:
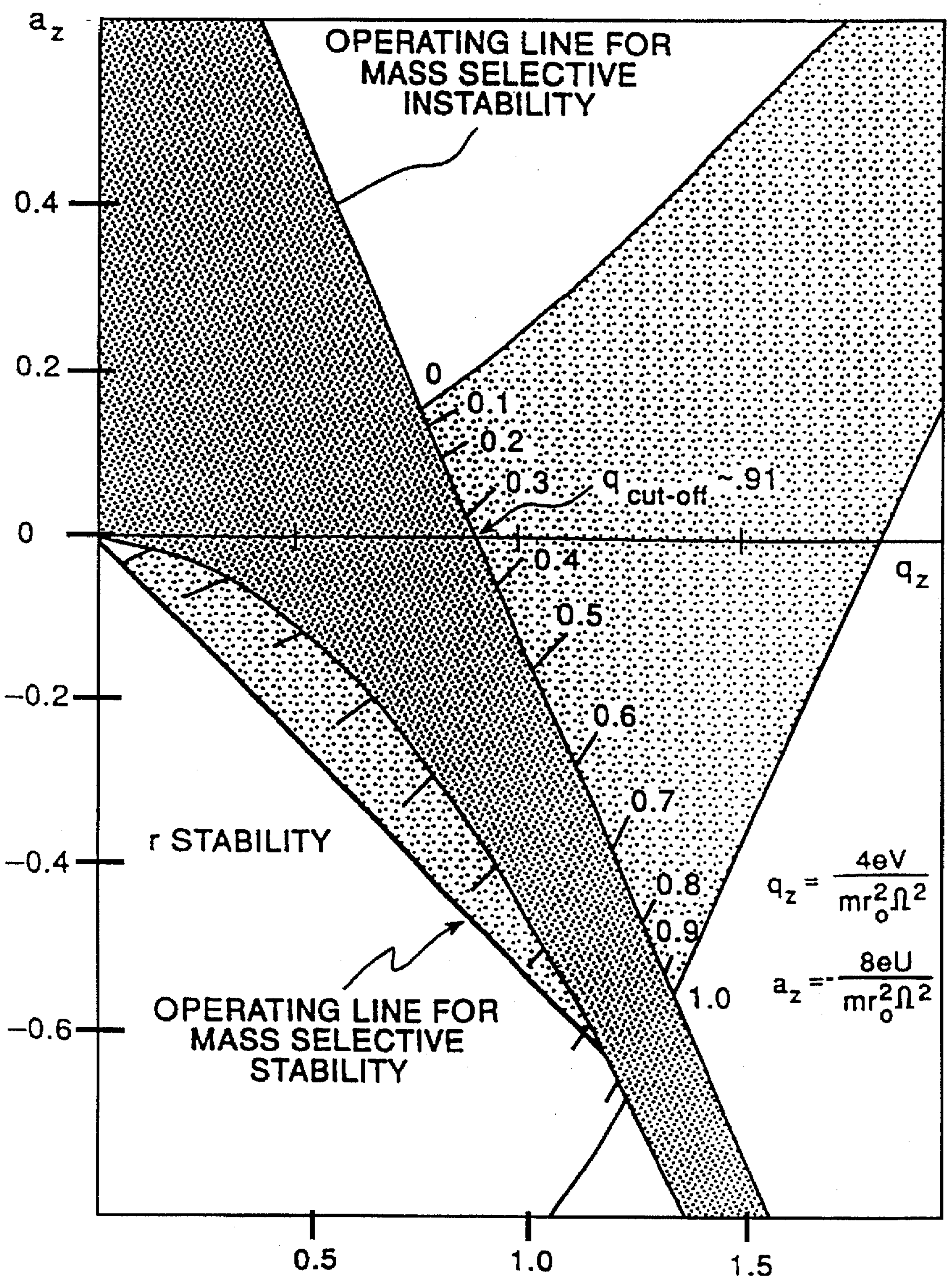
FIG. 2 PRIOR ART
FIG. 2 is a plot of a known Mathieu stability diagram for a quadrupole ion trap mass spectrometer.

Also referring to FIG. 2, the mass range of the trapped ions 5 may be determined by a known ion stability diagram, using the dimensionless Mathieu parameters ($a_z$ and $q_z$) which depend upon the radius ($r_o$) of the ring electrode 2, the direct current (DC) voltage (U) and RF trapping voltage (V) amplitudes, and the RF frequency ($F=\Omega/2\pi$). In the known mass selective instability operating mode, ions move along the $q_z$ axis (with $U=a_z=0$ from the left to the right in FIG. 2) with increasing RF voltage V amplitude. Ions of increasingly higher mass arrive at the stability border in succession, exit the ion trap 6 in the Z (axial) direction, and are detected by an electron multiplier detector 7 located behind the end-cap electrode 4. In this mass selective instability operating mode, ions become unstable in the strong RF trapping field.

An equilibrium condition of the amplitude of ion oscillation occurs whenever the power gained by the ion oscillator from the dipole excitation field produced by the bipolar RF excitation voltage $v_s$ is equal to the power lost in collisions with a buffer gas of the ion trap 6. If absorption takes place at the wing of the absorption contour, then the amplitude A of the ion oscillatory motion is determined by Equation 1:

$$A=\frac{F_s}{2m\omega_s\sqrt{\frac{1}{\tau^2}+a^2t^2}} \quad \text{(Eq. 1)}$$

wherein:

$F_s=zev_s/2^{1/2}r_o$ is excitation force z is ion charge e is electron charge $v_s$ is excitation voltage amplitude $r_o$ is radius of the ring electrode 2 m is ion mass $\omega_s=2\pi f_s$ is excitation voltage frequency $f_s$ is excitation voltage frequency $\tau$ is effective time between ion-neutral collisions describing damping of the ion oscillator $a=d\omega/dt$ is secular frequency scan rate $\omega$ is secular frequency of ion oscillation t is time with t=0 corresponding to $\omega=\omega_s$ Equation 1 is valid whenever the secular frequency is scanned linearly (i.e., $\Delta\omega=\omega_s-\omega=-at>>1/\tau$) or whenever the secular frequency scan rate is relatively low (i.e., $a^{1/2}\tau<<1$).

Figure 4:
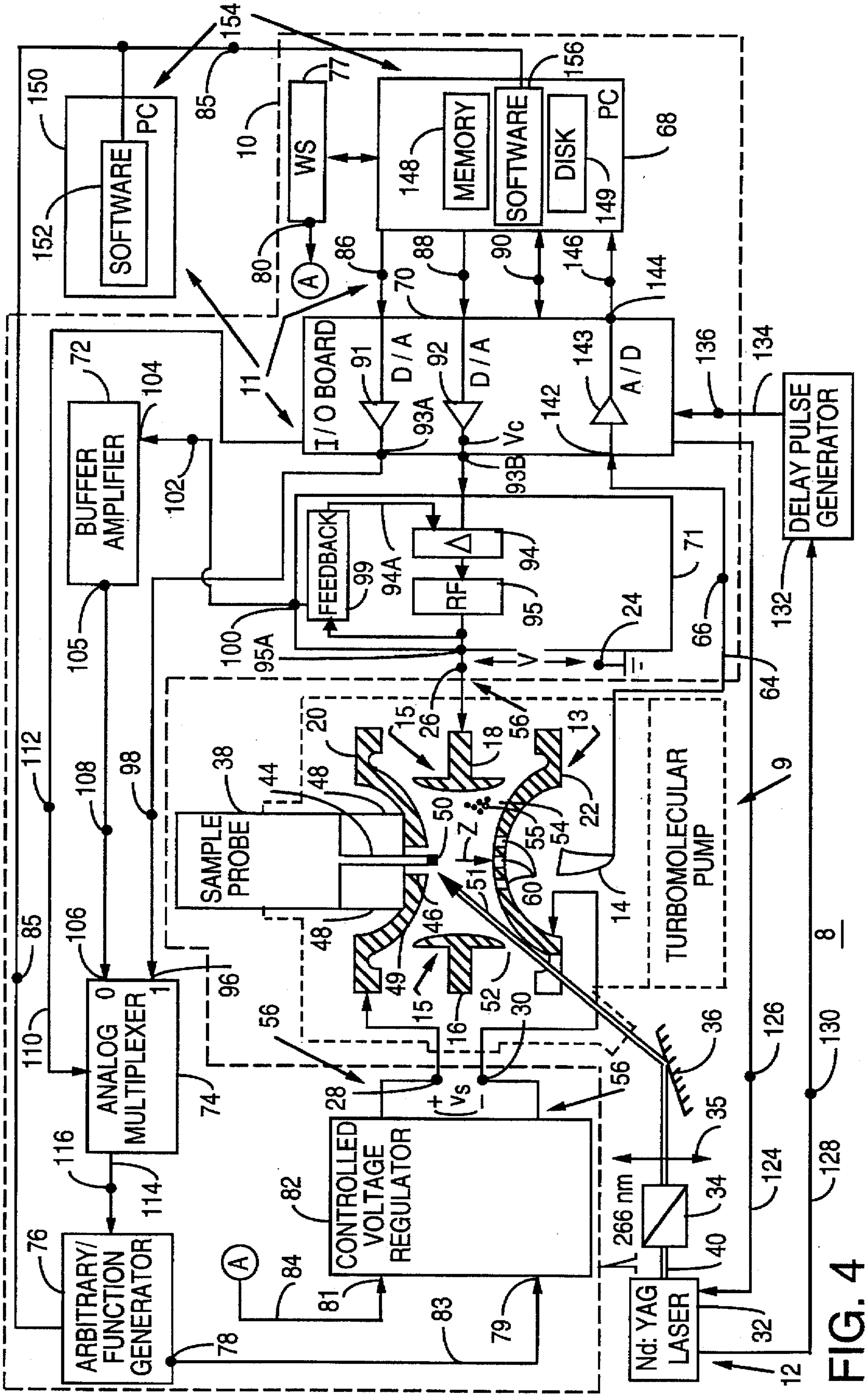
FIG. 4 is a block diagram of an ion trap mass spectrometer and associated system employable in the practice of the present invention.
Figures 5A, 5B, 5C, 5D:
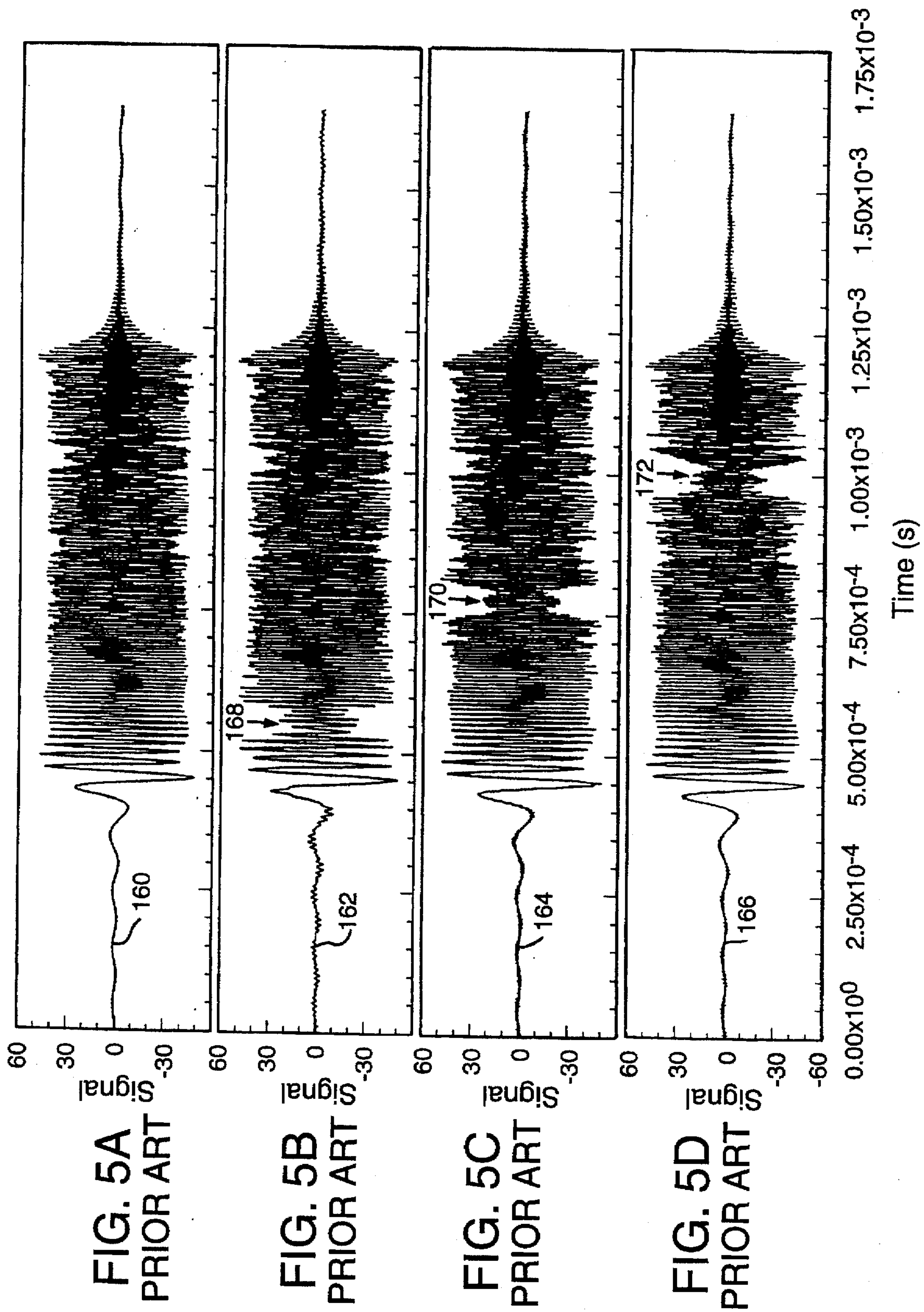
FIG. 5A PRIOR ART
FIG. 5B PRIOR ART
FIG. 5C PRIOR ART
FIG. 5D PRIOR ART
FIGS. 5A–5D are known broadband waveforms.

FIG. 4 shows a block diagram of a quadrupole ion trap mass spectrometer system 8. The system 8 includes an ion trap mass spectrometer (ITMS) 9 which is configurable for operation in the resonance ejection mode. The system 8 also includes a control sub-system 10 and an associated data acquisition sub-system 11. The system 8 further includes an ionizing mechanism 12 which produces ions from a plurality of neutral atoms or molecules. The ITMS 9 includes a quadrupole ion trap 13 for trapping and manipulating ions according to their m/z ratio, and a detector 14 such as, for example, a secondary emission multiplier for detecting ions. The exemplary ITMS 9 is a Finnigan MAT ion trap detector (ITD) which is modified, in part, for matrix-assisted laser desorption/ionization (MALDI) inside the ion trap 13 using the sub-systems 10, 11 and the ionizing mechanism 12, although the invention is applicable to other types of ion traps marketed by other vendors which are used alone or in combination with gas chromatography, liquid chromatography or electrophoresis. The ion trap 13 includes a central, hyperbolic cross-section, electrode 15 having two halves 16,18 (as shown in cross-section) which form a continuous ring. The ring electrode 15 is located between two hyperbolic end-cap electrodes 20,22.

In the resonance ejection mode, the control sub-system 10 applies a trapping RF voltage V (e.g., about 1.1 MHz at up to about 7,500 volts), with respect to a ground reference 24 for the system 8, to a line 26 which is connected to the half 18 of the ring electrode 15. In such mode, the control sub-system 10 also applies a relatively low amplitude bipolar RF excitation voltage $v_s$ (e.g., about 0–550 kHz at about 0–10 volts) between lines 28,30 which are electrically connected to the end-cap electrodes 20,22, respectively. The end-cap electrodes 20,22 of the exemplary ITMS 9 are isolated from the ground reference 24.

The ionizing mechanism 12, in the form illustrated, includes a laser 32, an attenuator 34, a lens 35, a mirror 36, and a sample probe 38, although the invention is applicable to a wide variety of ion generators such as, for example, MALDI outside of the ion trap 13 with subsequent ion introduction into the cavity 54 thereof, electrospray ionization (ESI), and electron impact (EI) ionization. In a preferred practice of the invention, MALDI ions are produced by laser desorption using a fourth harmonic (266 nm), laser beam pulse 40 of 10 ns duration from the exemplary Quantel International model YG660-10 Q-switched Nd:YAG laser 32. The laser beam 40 is attenuated by the exemplary Newport model 935-5 attenuator 34, focused by the exemplary 50 cm focal length UV quartz lens 35, and delivered onto the sample probe 38 using the mirror 36.

The sample probe 38 includes a probe tip 44 which is inserted inside the ion trap cavity 54. The probe tip 44 is centered within an existing hole 46, normally used for introduction of the electron beam, of the upper end-cap electrode 20 by a teflon spacer 48 which electrically isolates the probe tip 44 from the electrode 20. The probe tip 44 is generally flush with the inside surface 49 of the electrode 20.

A sample 50, for ionization, ion isolation and/or analysis, may be prepared as follows. A nicotinic acid matrix, prepared as a 0.1M solution in 4:1 water:acetonitrile, is mixed in equal volume amounts with a 0.0005M aqueous analyte or peptide solution. Approximately 1 μl of this mixture is deposited on the probe tip 44 to obtain several hundred single-shot spectra. The sample 50 on the tip 44 is illuminated by the focused laser beam 51 through the gap 52 between the ring electrode 15 and the lower end-cap electrode 22. The resulting MALDI ions, which are produced by the beam 51, are trapped within the cavity 54 of the ITMS 9 by the trapping RF voltage V.

The ramped trapping voltage method, used for trapping ions, involves ramping the trapping RF voltage V from zero to relatively high trapping values during the ion flight into the center of the cavity 54 of the ion trap 13. The desorbed ions easily penetrate the weak trapping field at the initial stage of RF ramping, but are trapped with high efficiency during the last stage of ramping, when they have reached the vicinity of the center of the ion trap 13. The settling value of the RF trapping voltage V at the storage period is usually about 60–80% of the maximum value of about 15 kV (peak-to-peak), which corresponds to the mass cutoff level of about 390–520 u. The pressure of helium buffer gas 55 in cavity 54 is estimated to be about $4–5\times10^{-4}$ Torr.

The control sub-system 10 includes a voltage application circuit 56 which applies the trapping RF voltage V on line 26 to the ring electrode 15 and the excitation voltage $v_s$ between lines 28,30 to the respective end-cap electrodes 20,22. As will be understood by those skilled in the art, in the resonance ejection mode, the ion trap 13 ejects the trapped ions according to a ratio of mass to charge (m/z) thereof along the Z axis through perforation holes 60 in the central part of the lower end-cap electrode 22 with the use of a weak dipole electric field produced by the bipolar excitation voltage $v_s$. The ejected ions bombard the detector 14 which provides a corresponding ion signal 64 on line 66. Equation 1, above, describes the ion oscillation amplitude with respect to time. Ions exit the ion trap 13 when $A=z_o$, where $z_o$ is the distance from the center of the trap 13 to the perforations 60 of the lower end-cap electrode 22. During mass scanning, in the resonance ejection mode, the control sub-system 10 controls the excitation voltage $v_s$ in order to, inter alia, excite the ions; scans the trapping RF voltage V in order to sequentially eject the ions from the cavity 54 of the ITMS 9; and, preferably, controls a ratio of the amplitude of the trapping RF voltage V to the amplitude of the excitation voltage $v_s$ in order that the ratio is generally constant.

Figures 3A, 3B, 3C, 3D:
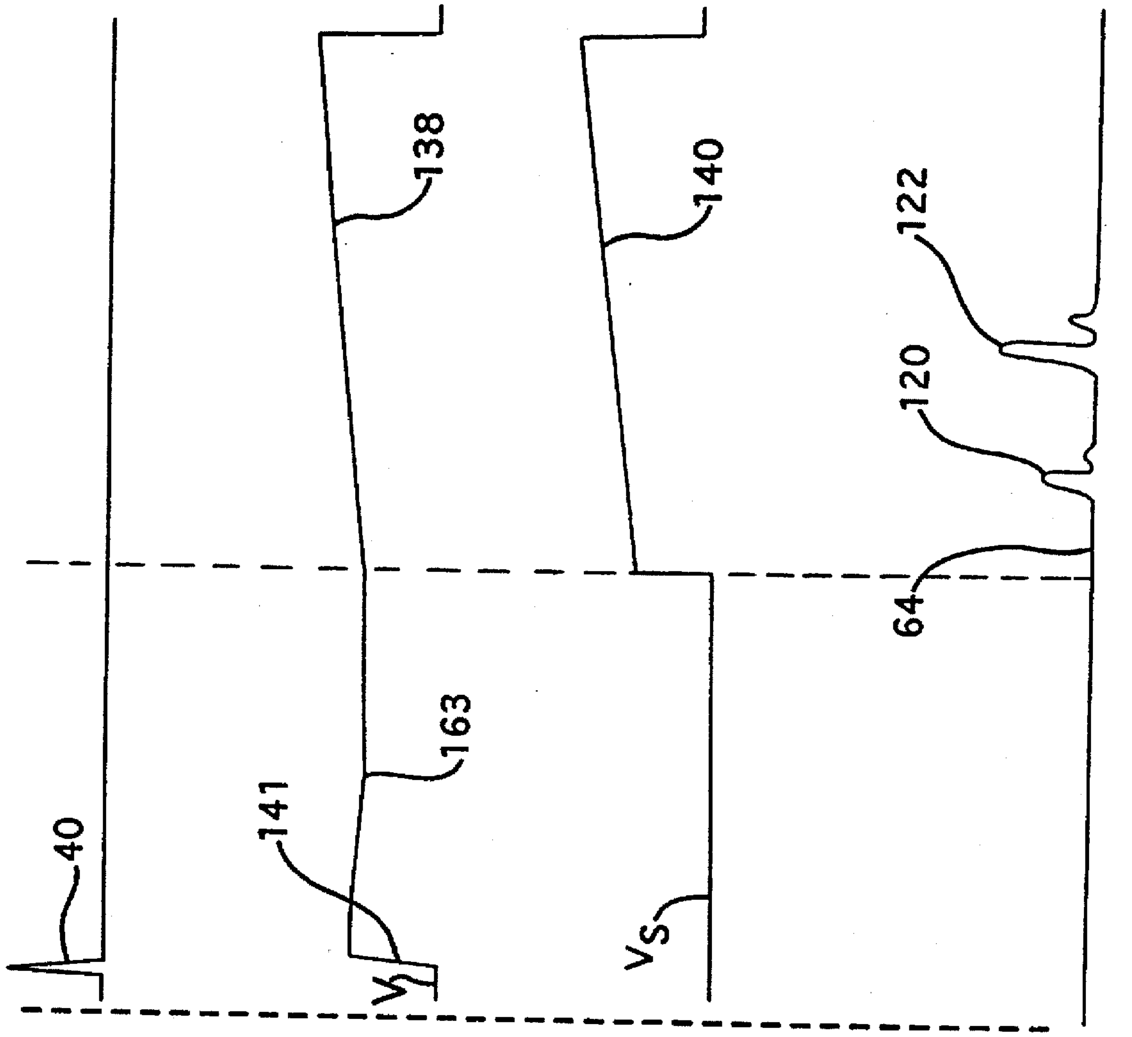
FIG. 3A PRIOR ART
FIG. 3B PRIOR ART
FIG. 3C PRIOR ART
FIG. 3D PRIOR ART
FIGS. 3A–3D are known waveforms employable with a quadrupole ion trap mass spectrometer.

In the resonance ejection mode, the control sub-system 10 controls and ramps the trapping RF voltage V as illustrated in the right portion 138 of FIG. 3B which, in turn, controls and ramps the excitation voltage $v_s$ as illustrated in the right portion 140 of FIG. 3C, although other methods are possible (e.g., independent control and ramping of both the trapping RF voltage V and the excitation voltage $v_s$).

Ions formed by MALDI, with initial kinetic energies of the order of several electronvolts, are trapped inside the ion trap 13 of FIG. 4 using a method of controlled gating of the trapping RF field (CGTF). See, for example, U.S. Pat. No. 5,399,857. This method includes ramping the RF field from zero to relatively high trapping values, as shown at portion 141 of FIG. 3B, during the ion flight into the center of the cavity 54 of the ITMS 9. The desorbed ions easily penetrate the weak trapping field at the initial stage of RF ramping, but are trapped with high efficiency during the last state of ramping, when they have reached the vicinity of the center of the ion trap 13.

Continuing to refer to FIG. 4, the control sub-system 10 further includes a personal computer (PC) 68; a multi-function input (I/O) board 70, such as a Lab-PC+ board marketed by National Instruments, associated with the PC 68; a trapping RF voltage generator 71, such as the analog board of the exemplary ITMS 9; a buffer amplifier 72; an analog multiplexer 74; an arbitrary/function generator 76, such as a Wavetek model 95; a waveform synthesizer (WS) 77, such as a Quatech plug-in board WSB-100 with an on-board 12-bit resolution module WSB-A12M, associated with the PC 68; and a controlled voltage regulator (CVR) 82. The I/O board 70 has various digital output lines (not shown) used for controlling the ITMS 9 operation including electron multiplier and RF voltage supply on/off, multiplier voltage set-up, and control of two digital to analog (D/A) converters 91,92. Output 78 of the arbitrary/function generator 76 is connected to input 79 of the CVR 82. Output 80 of the WS 77 is connected to the other input 81 of the CVR 82. In turn, the balanced output of the CVR 82 is connected to the lines 28,30 and, hence, to the end-cap electrodes 20,22, respectively. The exemplary arbitrary/function generator 76, operating as a synthesized function generator, is programmable by the PC 68 over an instrument bus (GPIB) 85.

The exemplary ITMS 9 is modified to operate beyond the standard 650 u upper mass by application of a supplementary bipolar RF voltage $v_s$ across the end-cap electrodes 20,22. This produces a dipole RF field therebetween. The output voltage $v_s$ follows input control signal 83 and input control waveform 84 derived from the function generator 76 and the WS 77, respectively. The inputs 79,81 are summed by a CVR amplifier (not shown) which is resistively weighted to produce a maximum amplitude of about 20 V (zero-to-peak) between the end-cap electrodes 20,22 for either the output 78 of the function generator 76 or, alternatively, the output 80 of the WS 77.

The output 78 of the function generator 76 provides a suitable excitation signal 83 with a sinusoidal excitation frequency $f_s$ to the CVR 82. The output 80 of the WS 77 provides a suitable broadband excitation waveform 84. During analytical scans, the function generator 76 produces the sinusoidal excitation signal 83. During ion isolation operations, the waveform synthesizer 77 generates the broadband excitation waveform 84. The CVR 82 controls and maintains the selected amplitude of the bipolar excitation voltage $v_s$ at the same magnitude (i.e., $+v_s/2, -v_s/2$) with changes in the corresponding current (e.g., ±0.4 A) to the end-cap electrodes 20,22, respectively, which produces a suitable dipole RF field therebetween.

The exemplary I/O board 70 and WS 77 are plug-in connected to the PC 68. The PC 68 communicates plural output signals 86,88 and other digital input/output signals 90 to the I/O board 70. The I/O board 70 has exemplary 12-bit resolution D/A converters 91,92 which provide two analog outputs 93A,93B from the digital values of the output signals 86,88, respectively, of the PC 68. The analog output 93B of D/A 92 drives an error amplifier 94 of the trapping RF voltage generator 71 which compares a feedback voltage 94A with a control voltage $V_c$ from the analog output 93B. The error amplifier 94, in turn, modulates the trapping RF voltage V at the output 95A of the RF voltage amplifier 95 for the ring electrode 15. The analog output 93A of the other D/A 91 is connected to an input 96 of the multiplexer 74 by line 98.

A feedback circuit 99 senses the trapping RF voltage V and generates an analog output 100 and the feedback voltage 94A therefrom. The amplitude of the output 100 and the feedback voltage 94A are proportional to the amplitude of the trapping RF voltage V. The output 100 is connected by a line 102 to the input 104 of the buffer amplifier 72. The output 105 of the buffer amplifier 72 is connected to another input 106 of the multiplexer 74 by line 108. The multiplexer 74 is controlled by the PC 68 using a multiplexer control signal 110 from the I/O board 70 on line 112. The signal 110 selects one of the inputs 96,106 of the multiplexer 74 for use in presenting a modulation signal 114 to the generator 76 on line 116.

The arbitrary/function generator 76 is programmed by the PC 68 to operate in a suppressed carrier modulation mode in which the amplitude of the output sinusoidal waveform signal 83 at the output 78 thereof is proportional to the external modulation signal 114. Two kinds of modulation signal sources may be used in the exemplary embodiment. The first is the output 93A of the I/O board 70 which may be set by software of the PC 68 independently from the trapping RF voltage control signals. The second is the output 100 of the trapping RF voltage generator 71, which is proportional to the amplitude of the trapping RF voltage V. These embodiments preferably provide a generally constant ratio between the amplitude of the trapping RF voltage V and the amplitude of the excitation voltage $v_s$. During analytical scans, these embodiments provide linear proportional dependence between the mass of the ejected ions and the trapping RF voltage V. Rapid switching between the two modulation signal sources is performed by the digital signal 110 on line 112 from the I/O board 70 of the PC 68.

Referring again to FIGS. 3A–3D and 4, the exemplary waveforms employed with the ITMS 9 in the resonance ejection mode, respectively illustrate the laser beam pulse 40, the trapping RF voltage V, the excitation voltage $v_s$, and the detector ion signal 64 which has a plurality of mass spectral peaks 120,122 associated therewith. The waveforms of FIGS. 3A–3D are representative of a single mass analyzing scan of an overall scan sequence including ion generation, trapping, manipulating and mass analyzing. The overall scan sequence may be repeated for accumulation of the detector ion signal 64 in order to improve the spectral signal to noise ratio.

Continuing to refer to FIG. 4, each ion generation cycle is started by the PC 68 using a laser control signal 124 on line 126 from the I/O board 70 to the laser 32. In turn, the laser 32 produces the pulse 40 and the laser electronics (not shown) produce a start pulse 128 on line 130 to a delay pulse generator 132. After a predetermined delay, the pulse generator 132 provides a delayed start pulse 134 on line 136 to the I/O board 70. The delayed start pulse 134 coordinates the timing of the control sub-system 10 and the data acquisition sub-system 11, in order to achieve optimal trapping efficiency for the desorbed ions.

In the resonance ejection mode of the ITMS 9, the output ion signal 64 of the detector 14 on line 66 is connected to an input 142 of a 12-bit resolution analog to digital (A/D) converter 143 of the I/O board 70. The output 144 of the A/D 143 is connected by line 146 to the PC 68. The PC 68 collects the digital representation of the ion signal 64 from the line 146, saves the acquired data with respect to the trapping RF voltage V in a memory 148 of the PC 68, and stores the saved data in a disk drive 149 of the PC 68. After the ion signal data is acquired, saved and stored, it is transferred, along with corresponding samples of the trapping RF voltage V and a suitable calibration constant, to another PC 150 using the GPIB interface 85. It will be appreciated that while reference has been made to the exemplary PC's 68,150, other processors such as, for example, microcomputers, microprocessors, workstations, minicomputers or mainframe computers may be employed. The PC 150 uses the calibration constant to calculate the associated mass-to-charge ratio m/z values, although the invention is applicable to control and/or data acquisition sub-systems 10,11 implemented in a single PC or processor which, for example, collects the ion signal data and calculates the associated mass-to-charge ratio m/z values.

The PC 150 includes data acquisition system software 152 which processes and plots the ion signal data as discussed below in connection with FIGS. 9A–9E, 10A–10B and 12A–12D. The data acquisition sub-system 11 includes the I/O board 70 which receives the ion signal 64, the PC's 68, 150 which are connected by the interface bus 85, and the software 152 for plotting the mass spectra. A suitable software package for this purpose is TOFWare, a WINDOWS-based dam acquisition system marketed by ILYS Software. The PC 68 further transfers calibration information to the PC 150 over the GPIB interface 85 in order to scale the vertical axis (relative intensity) as a function of the amplitude of the ion signal 64 and the horizontal axis (m/z) as a function of the trapping RF voltage V for the exemplary mass spectra. In this manner, a subsystem 154, which consists of the PC 68, the PC 150 and the software 152, determines the mass-to-charge ratio (m/z) of at least some of the separated ions of the ITMS 9.

The PC 68 includes software 156 which controls the trapping RF voltage generator 71 and ITMS 9, the laser 32, and the multiplexer 74. The software 156 also designs and loads waveforms into memory (not shown) of the WS 77, and triggers these when appropriate. The software 156 further acquires and transfers the ion signal data through the GPIB interface 85 to the PC 150, and controls the operation of the function generator 76 (e.g., mode of operation, frequency) through the GPIB interface 85. The data acquisition of the ion signal data is performed synchronously with the generation of the output signals 86,88. The duration between adjacent data acquisition points is about 100 μs.

The design of the broadband excitation waveform 84 is an important part of the present invention. With the introduction of nonlinear phase modulation to the SWIFT method, in contrast to the unmodulated phase case, ejection of ions from the ion trap 13 is no longer simultaneous. In the ion trap 13, the resonance frequency f is attributed to every ion which depends upon its m/z ratio. The spectrum of the broadband excitation waveform 84 shows what ions will be excited by this waveform and to what extent.

Any infinite periodic function in the time domain may be represented as a sum of harmonic functions, although infinite-in-time functions are never believed to be used in practice. Hence, the broadband excitation waveforms disclosed herein are designed in such a way that their values are close to zero at the boundaries of the time interval to avoid boundary effects. A special procedure called apodization may be applied for this purpose. See, for example, Chen, L. et al., *Anal. Chem.*, Vol. 59, pp. 449–54 (1987). Boundary effects are usually observed when the broadband waveform is applied for a single period, and are almost not observable when the waveform is repeated many times.

Equation 2 presents a time-discrete function $U_i$:

$$U_i = \sum_{k=k_{min}}^{k_{max}} A_k \cos(-2\pi ik/N + \phi_k) \quad \text{(Eq. 2)}$$

wherein:

time-discrete function $U_i$ includes points $t_i = i\delta t$ $\delta t$ is sampling interval i is an integer between 0 and N−1 k is an integer between $k_{min}$ and $k_{max}$

N, $k_{min}$ and $k_{max}$ are integers $A_k$ is magnitude of a spectral Fourier component with a frequency $f_k = k\delta f$ $\delta f = 1/(N\delta t)$ is distance between frequencies in the spectrum $\phi_k$ is initial phase of the k-th component spectral components outside the frequency range $k_{min}\,\delta f$ to $k_{max}\delta f$ have zero magnitude Although the sampling interval δt is not among the parameters of Equation 2, the frequency limits $f_{min}$ and $f_{max}$ are dependent on δt. In the ion trap 13 of FIG. 4, a suitable approximation of the magnitudes $A_k$ of the Fourier components may be set equal to each other in order to achieve uniform excitation of ions of different masses. In the exemplary embodiment, as discussed below in connection with FIGS. 7A–7H, the magnitudes $A_k$ are set equal to 1 for all points except notches where $A_k$ is set equal to zero. Also, the actual waveform functions are normalized to fit the amplitude resolution (e.g., a −2048 to 2047 range for 12-bit resolution) of the exemplary waveform synthesizer (WS) 77.

For relatively long time domain, broadband waveforms (i.e., N>>1), the summation of Equation 2 may be replaced by the integral of Equation 3:

$$\int \cos[-\omega t+\phi(\omega)]d\omega=\int \frac{\cos u}{d\phi(\omega)/d\omega-t}\,du \quad \text{(Eq. 3)}$$

wherein:

$\Omega=2\pi f$ f is broadband excitation frequency $u=\omega t+\phi(\omega)$

At time t, the maximum contribution to the integral of Equation 3is made by the component ω having phase $\phi(\omega)$ which satisfies the condition $d\phi(\omega)/d\omega=t$. This condition is rewritten in Equation 4:

$$\frac{d\phi(f)}{df}=2\pi t(f) \quad \text{(Eq. 4)}$$

Once the dependence of the broadband excitation frequency f, which is related to ion mass, upon time is chosen, then the initial phase of every Fourier component may be determined by solving Equation 4. The integration constant, or the phase of minimal frequency $f_{min}$, is relatively unimportant and, hence, generally any value may be chosen for $\phi(\omega_{min})$.

The solution of Equation 4, in the time-discrete presentation, is shown in Equation 5:

$$\phi_k=\phi_{k-1}+2\pi t_k(f_k-f_{k-1}) \quad \text{(Eq. 5)}$$

wherein:

$t_k$ is time when ions of resonance frequency $f_k$ are excited and ejected from trap 13 Of course, ions are excited and successively ejected by the waveform $U_i$ of Equation 2 with the initial phase determined by Equation 5 only in suitable approximations. However, in many situations, this approximation is suitable and ion ejection may be described by the exemplary successive excitation model of Equations 2–5.

Some examples of broadband waveforms employing successive excitation are shown in FIGS. 5A–5B and 6A–6B. These correspond to simple linear dependencies for time $t_k=a+bk$ in Equation 5. A linear dependence of time $t_k$ upon k in Equation 5 results in a quadratic dependence for phase $\phi_k$ in which the dynamic range of the broadband excitation waveform 84 of FIG. 4 is minimized. However, Equation 5 is applicable not only for the linear case, but also for cases in which neither the dependence of phase $\phi_k$ upon k is quadratic nor the dynamic range of the broadband excitation waveform 84 is minimized.

FIGS. 5A–5D respectively illustrate conventional or normal (see Table I below) broadband excitation waveforms 160,162,164,166 (with signal amplitude corresponding to $A_k=1$ for Equation 2 shown with respect to time in seconds): (A) without any notches; (B) with a notch 168, corresponding to ions of interest, at f=100±20 kHz; (C) with a notch 170 at f=250±20 kHz; and (D) with a notch 172 at f=400±20 kHz. The width of the notches 168,170,172, is chosen to be large enough to observe the effect, which is very similar in appearance to turning off the frequency sweep for some time interval. The position and width of the notches of FIGS. 5B–5D correspond approximately to those expected for an interrupted frequency sweep.

Parameters, shown in Table I below, of the conventional broadband excitation waveforms 160,162,164,166 of FIGS. 5A–5D are employed by the software 156 of the PC 68 of FIG. 4 to generate such waveforms. Normal broadband waveforms A–E are generated according to a function for phase modulation which is similar to that shown in FIGS. 7A–7B. Stretched-in-time broadband waveforms, designated a–e herein, are similar to the broadband waveform 188 of FIGS. 7C–7D and have the same parameters as broadband waveforms A–E, respectively, except for low and high frequency limits. Time-reversed broadband waveforms, designated as A–E and a–e, have the same parameters as broadband waveforms A–E and a–e, respectively, except the direction of broadband waveform sampling is reversed.

The practical synthesis of normal broadband excitation waveforms having the widest frequency spectrum (i.e., from 10 to 560 kHz, such as broadband waveforms A–E in Table I) is different from those having narrower frequency ranges (i.e., stretched-in-time broadband waveforms a–e). In particular, broadband waveforms A–E without any notches are calculated in advance and stored in the memory 148 of the PC 68 of FIG. 4. Before an ion isolation experiment, only the contribution of notch intervals (e.g., corresponding to the interruption gap 186 of FIGS. 7A–7B) to the sum of Equation 2 is calculated. Then, such contribution of notch intervals is subtracted from the stored broadband waveform and the resulting broadband waveform is loaded into the memory (not shown) of the WS 77. The stretched-in-time broadband waveforms a–e are calculated before loading into such memory of the WS 77, although broadband waveforms generated by any other external software may also be loaded into such memory.

TABLE I

| Broadband excitation waveform designation | A | B | C | D | E |
|---|---|---|---|---|---|
| Number of points (N) in the broadband waveform | 2048 | 4096 | 8192 | 16000 | 32000 |
| Sampling rate (MHz) | 1.25 | 1.25 | 1.25 | 1.25 | 1.25 |
| Duration of the broadband waveform (ms) | 1.638 | 3.277 | 6.554 | 12.8 | 25.6 |
| Lowest frequency in the spectrum (kHz) | 10 | 10 | 10 | 10 | 10 |
| Highest frequency in the spectrum (kHz) | 560 | 560 | 560 | 560 | 560 |
| Frequency separation between adjacent discrete frequencies in the spectrum (Hz) | 610.4 | 305.2 | 152.6 | 78.13 | 39.06 |
| Number of notches in the broadband waveform | up to 5 | up to 5 | up to 5 | up to 5 | up to 5 |

Figures 6A, 6B:
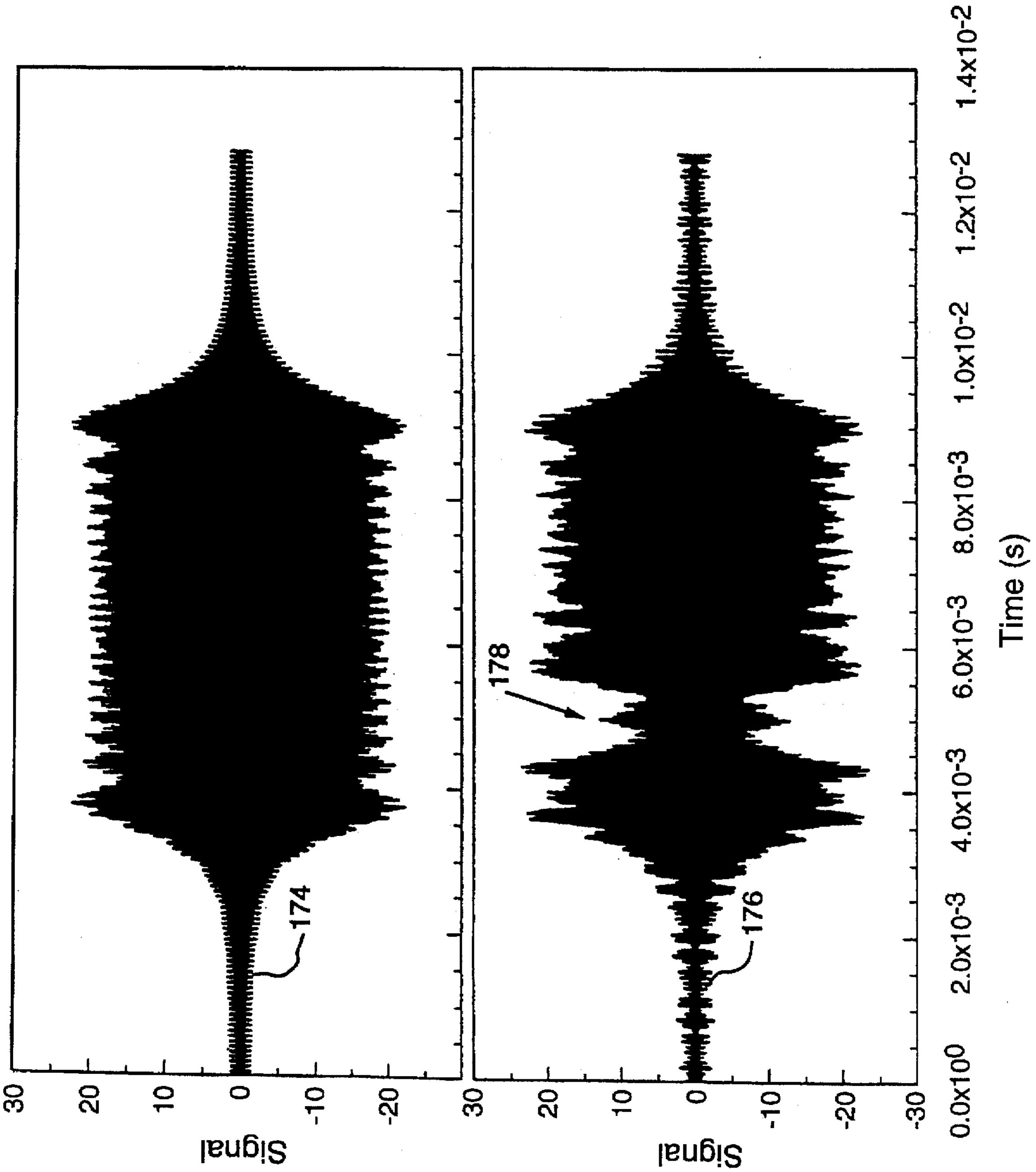
FIGS. 6A–6B are stretched-in-time broadband waveforms employable in the practice of the present invention.

FIGS. 6A–6B respectively illustrate "stretched-in-time" (d-type) broadband excitation waveforms 174,176 (with the same units as in FIGS. 5A–5B), in accordance with the present invention, corresponding to the exemplary frequency range 208.56–222.25 kHz: (A) without any notches; and (B) with a notch 178, corresponding to ions of interest, at a frequency range f=211.94–213.00 kHz. The broadband waveforms 174,176 are termed "stretched-in-time" herein due to the relatively slow frequency scan rate associated therewith.

FIGS. 6A–6B illustrate stretched-in-time broadband waveforms for a relatively narrow frequency range. The internal fine structure of the broadband waveforms 174,176 is not resolved in this case, because of the relatively long length thereof. An exemplary frequency range of about 14 kHz, in contrast with the 550 kHz range of FIGS. 5A–5D, is stretched into about a 6 ms time interval. On this background, the narrow 1 kHz width notch 178 of FIG. 6B appears to be very broad.

Some of the properties of the normal broadband excitation waveforms 160,162,164,166 may be observed from data corresponding to FIGS. 5A–5D. The number of points (e.g., N=2048) is employed to design such waveforms 160,162, 164,166 in order to show the real structure thereof. The same structure is observed for longer broadband waveforms, such as broadband waveforms 174,176 of FIGS. 6A–6B, but is observable only at higher resolution (not shown). The signal values on the vertical axes of FIGS. 5A–5D correspond to $A_k=1$ in Equation 2 for the unnotched frequency domain.

Figure 7A:
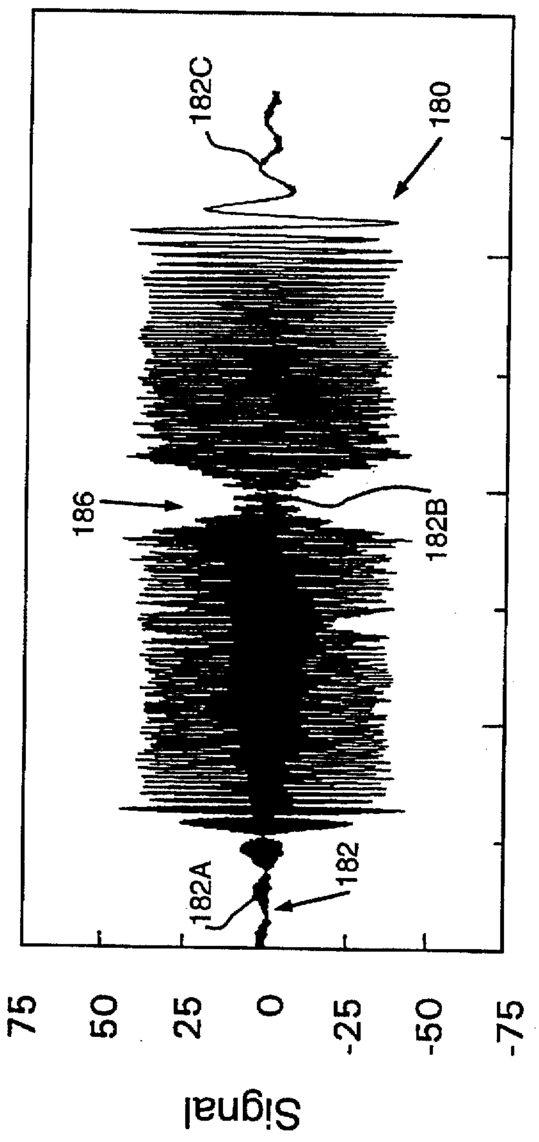
FIG. 7A PRIOR ART
FIG. 7A (signal amplitude with respect to time) and FIG. 7B (frequency with respect to time) form a known broadband waveform.
Figure 7B:
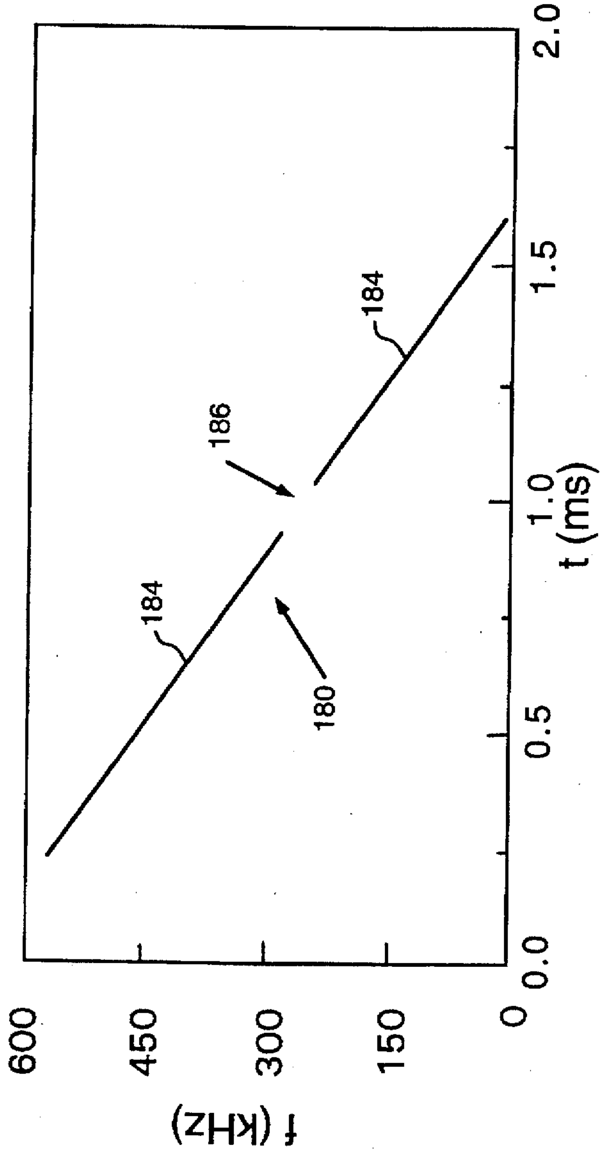
FIG. 7B PRIOR ART
FIGS. 7C–7D, 7E–7F and 7G–7H (with the first plot being signal amplitude with respect to time and the second plot being frequency with respect to time) form three broadband waveforms employable in the practice of the present invention.

A prior art broadband excitation waveform for ejecting ions from an ion trap is shown in FIGS. 7A–7B. A normal or conventional broadband excitation waveform 180 includes a plot 182 of signal amplitude with respect to time (ms) and a plot 184 of frequency with respect to time (ms) of the same broadband waveform 180. In this broadband waveform 180, the frequency is swept over the relevant frequency region with a short interruption gap 186 to avoid the ejection of ions of interest from the ion trap 13. With respect to the time scale of this frequency sweep, this interruption gap 186 is relatively short. Therefore, such ions of interest have no opportunity to relax down to rest in the event that they were accidently excited before the interruption gap 186. Furthermore, such ions have a good chance to be ejected from the ion trap 13 after the interruption gap 186. This does not allow the achievement of high resolution for ion excitation.

In FIG. 7A, the plot 182 of signal amplitude has a portion 182B corresponding to the interruption gap 186, a portion 182A corresponding to prior to the beginning of the plot 184, and a portion 182C corresponding to after the end of the plot 184. The amplitude of the plot 182 in the portions 182A, 182B,182C is generally substantially less than the amplitude (corresponding to $A_k=1$ in Equation 2) of the plot 182 corresponding to the plot 184 on either side of the interruption gap 186. The portions 182A,182B,182C are not shown in FIG. 7B because no frequency component is assigned to these portions. In the time domain spectrum of FIG. 7A, the signal shown in such portions 182A,182B,182C corresponds to transition signals observed in the switching process.

Figure 7C:
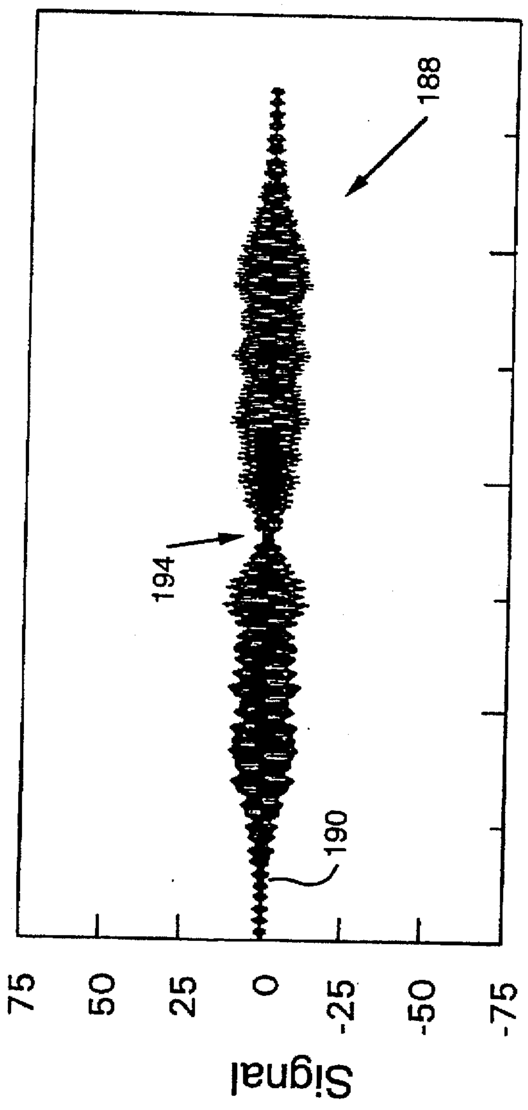
Figure 7D:
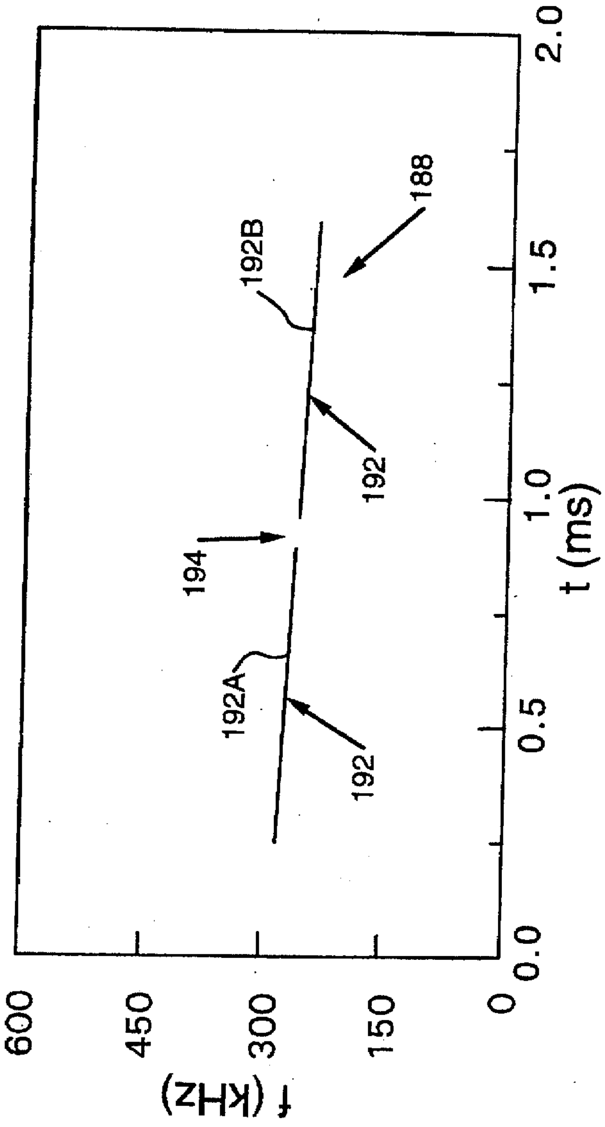

Another broadband excitation waveform 188 used for fine ion isolation in combination with the broadband waveform 180 of FIGS. 7A–7B is shown in FIGS. 7C–7D. The broadband waveform 188 includes a plot 190 of signal amplitude with respect to time (ms), a plot 192 of frequency with respect to time (ms), and an interruption gap 194. The broadband waveform 188 is different from the broadband waveform 180 of FIGS. 7A–7B and has: (1) a smaller range of frequency sweep (shown with respect to the vertical axis of FIGS. 7D and 7B); (2) a smaller mass scan rate for ion ejection (shown by the smaller slope of the plot 192 of FIG. 7D with respect to the slope of the plot 184 of FIG. 7B); and (3) a smaller interruption gap 194 with respect to the gap 186 of the plot 184 of FIG. 7B). The smaller mass scan rate of FIG. 7D results in higher accuracy of mass ejection and provides higher resolution for ion isolation. Additionally, any ions which are excited before the interruption gap 194 have a relatively long time to rest due to the damping collisions with buffer gas molecules 55 of FIG. 4.

The WS 77 of FIG. 4 controls a first larger rate of change of the mass-to-charge ratio of ions ejected from the ion trap 13 (which corresponds to the rate of change of the frequency of the plot 184 of FIG. 7B) with the broadband waveform 180 of FIGS. 7A–7B, and controls a second smaller rate of change of the mass-to-charge ratio of ions ejected from the ion trap 13 (which corresponds to the rate of change of the frequency of the plot 192 of FIG. 7D) with the broadband waveform 188 of FIGS. 7C–7D. The first portion 192A of the broadband waveform 188 of FIG. 7D excites substantially all ions having a first mass-to-charge ratio range different from the mass-to-charge ratio range of the ions of interest. The second portion 192B excites substantially all ions having a second mass-to-charge ratio range different from the mass-to-charge ratio range of the ions of interest and the first mass-to-charge ratio range. Since different frequencies of the vertical axis of FIG. 7D correspond to ions of different mass-to-charge ratios, the portions 192A, 192B successively excite ions of different mass-to-charge ratios with respect to time during the broadband waveform 188, excluding the time corresponding to the interruption gap 194 during which such portion of the broadband waveform 188 does not excite ions, such as the ions of interest.

The time for ion relaxation during the interruption gap, such as the gap 194, is of significant importance. The design of the broadband excitation waveform 84 of FIG. 4 is determined by the time of relaxation of kinetic energy and internal energy of the ions of interest. The buffer gas molecules 55 of the ion trap 13 collide with the ions of interest which have a time of relaxation of kinetic energy associated with such collisions. The time of duration of the exemplary interruption gap 194 of FIGS. 7C–7D is preferably chosen to be at least about equal to such time of relaxation.

Figure 7E:
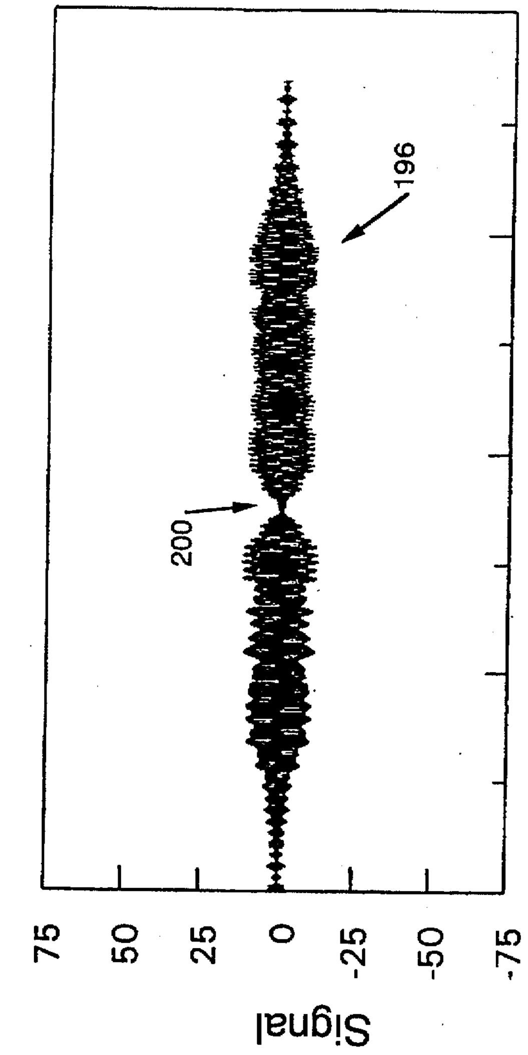
Figure 7F:
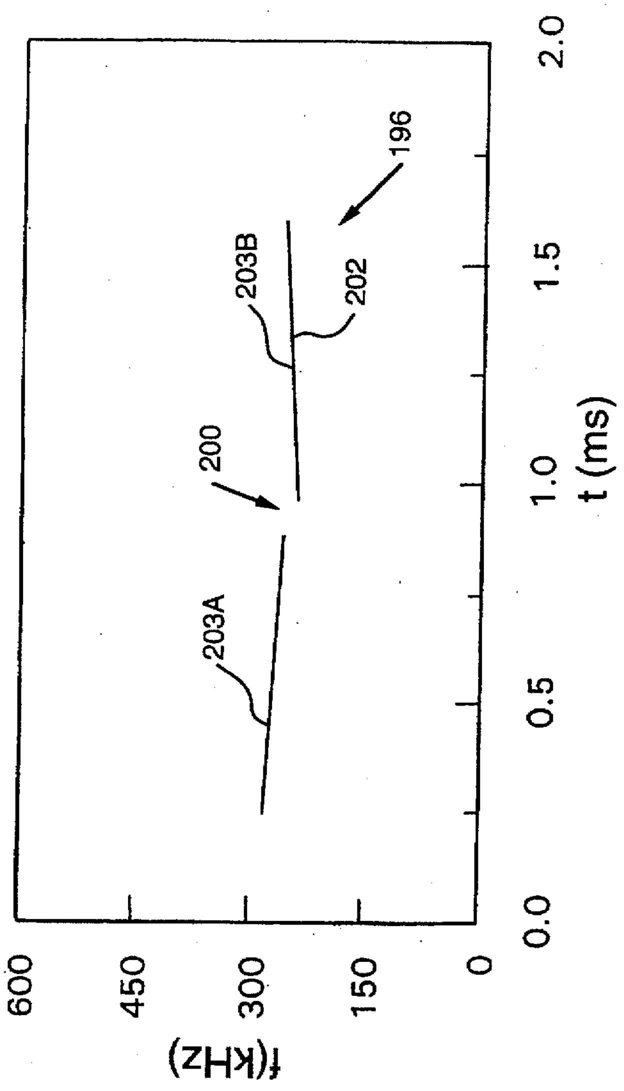

Other broadband excitation waveforms 196 and 198 preferred for ion isolation are respectively shown in FIGS. 7E–7F and 7G–7H, although the number of suitable broadband waveforms is not limited by these examples. In FIGS. 7E–7F, as shown in FIG. 7F, the frequency is swept in the direction toward the resonance frequency of the ions of interest (i.e., with a negative slope) before the interruption gap 200. In contrast to the broadband waveform 188 of FIGS. 7C–7D, the sweep direction is reversed after the interruption gap 200 when it is again swept in the direction toward the ions of interest (i.e., with a positive slope). Such switch of sweep direction allows the ions of interest to relax a much longer time in comparison with the broadband waveform 188 shown in FIGS. 7C–7D. The time for relaxation in FIGS. 7E–7F is increased by the duration of the sweep 202 after (i.e., second portion 203B) the interruption gap 200.

Figure 7G:
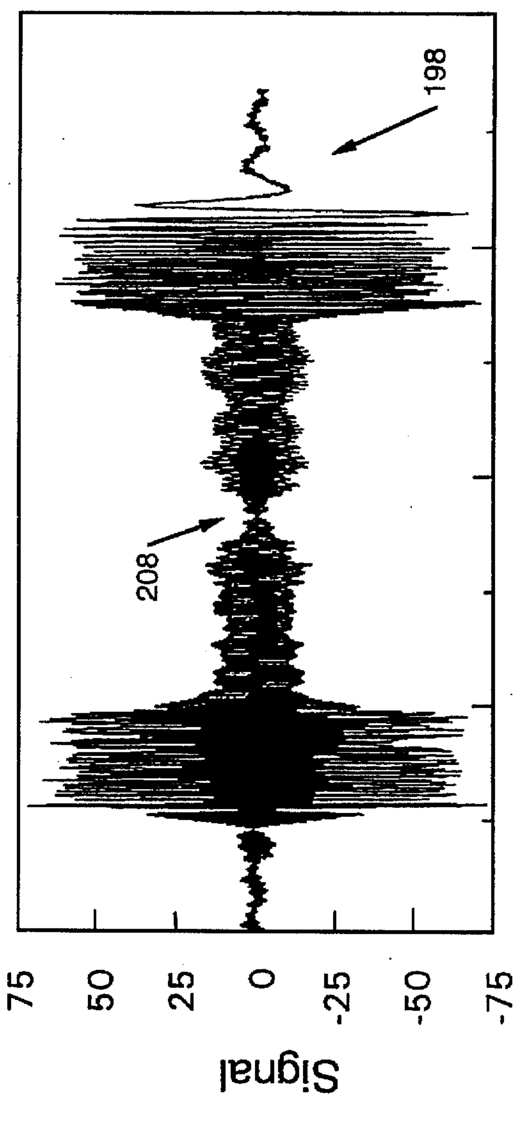
Figure 7H:
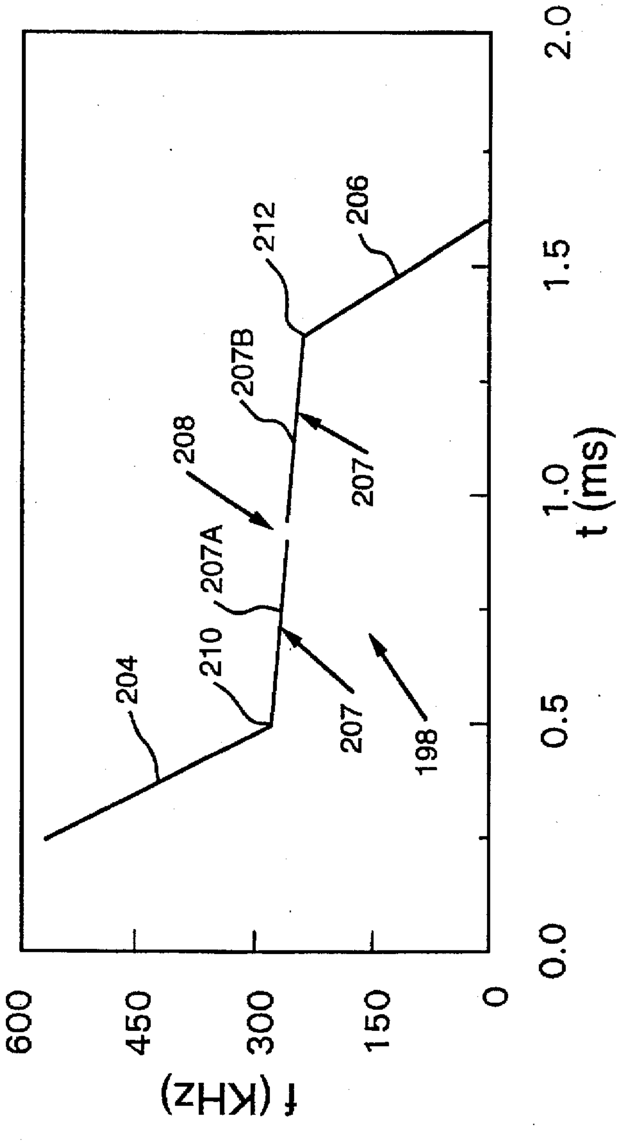

The design of the broadband excitation waveform 198 of FIGS. 7G–7H has a changeable rate of frequency sweep and a changeable mass scan rate of ion mass ejection. In this case, as shown by portions 204,206 of the broadband waveform 198 of FIG. 7H, ions are ejected with a relatively large mass scan rate (i.e., with a relatively large negative frequency slope) at a relatively distant frequency (with respect to the vertical axis of FIG. 7H) from the frequency of the ions of interest at about the frequency corresponding to the interruption gap 208. Also, ions are ejected with a relatively small mass scan rate (i.e., with a relatively small negative frequency slope) in the portion 207 in the vicinity of such frequency at which the accuracy of ion ejection is significant. An important feature of the broadband waveform 198 of FIGS. 7G–7H is that ion isolation may be achieved in a single step, while the broadband waveforms 188,196 of FIGS. 7C–7F employ a preliminary rough isolation step using, for example, the broadband waveform 180 represented in FIGS. 7A–7B. The broadband waveform 198 of FIGS. 7G–7H reduces the time of the ion isolation experiment and, in some cases, increases the duty cycle.

Other broadband excitation waveforms may be suggested, for example, by the combination of the broadband waveforms 180–188 of FIGS. 7A–7D and the broadband waveforms 180–196 of FIGS. 7A–7B, 7E–7F. The main features of such broadband waveforms 198,180–188,180–196 are: (1) the relatively slow mass scan rate in the vicinity of the frequency range corresponding to the ions of interest (i.e., the ions to be isolated); and (2) the relatively long time of the interruption gaps 194,200,208 necessary for the relaxation of ion energy between scan periods before and after such gaps.

Preferably, smaller values of δt are chosen for a better description of the function $U_i$ of Equation 2 at relatively high frequencies. In practice, because of the limited memory of the exemplary waveform synthesizer (WS) 77 of FIG. 4, there is a trade-off between this preference for smaller values of δt and the possibility of having narrow notches (i.e., interruption gaps 194,200,208) in the spectrum. The smallest width for the exemplary notches 194,200,208 is determined by the distance δf between frequencies in the spectrum which, in the case of a limited number N of points of on-board memory of the WS 77, is smaller for a larger sampling interval δt. A flatness of the broadband excitation waveform spectrum is generally not critical for application in ion traps such as the exemplary quadrupole ion trap 13. For an exemplary sampling rate of 1.1 MHz (δt=0.91 μs), about a 15% drop in amplitude at a frequency of 600 kHz is expected. In the exemplary embodiment, a value of about δt=0.8 μs is employed, which corresponds to a sampling rate of 1.25 MHz.

The software 156 of the PC 68 of FIG. 4 includes a technical plotting and data processing program, such as PSI-Plot marketed by Poly Software International, which calculates broadband waveforms similar to those of FIGS. 7E–7F and 7G–7H. Broadband waveforms, similar to those of FIGS. 7A–7B and 7C–7D, are calculated directly by the software 156. The software 156 employs an inverse Fourier transform to design the single broadband waveform 198, and one or both of the broadband waveforms 180 and 188,196 therewith. The number of broadband waveforms that may be loaded into the memory of the exemplary WS 77 is limited by the number (e.g., 32768) of points of on-board memory. The broadband waveforms may be triggered by the software 156 plural times, at any moment in time, in forward or reverse directions, with a programmable number of cycles, and with a programmable magnitude. Due to the "frequency sweep" appearance of FIGS. 5B–5D, the maximum signal magnitude of the broadband waveforms 162,164,166 actually does not depend on the number and widths of the notches used. This is convenient when precalculated SWIFT waveforms are used (e.g., normal broadband waveforms A–E) because no renormalization is necessary after notching the starting or base notchless broadband waveform.

The waveforms 180,188,196,198 include a frequency domain, a time domain, a duration, and a spectral distribution of magnitude of discrete Fourier components in such frequency domain which excite ions excluding at least substantially all of the ions of interest. As discussed above in connection with Equations 2–5, the waveforms 180,188, 196,198 employ a plurality of times ($t_i$) of effective action of a plurality of discrete Fourier components in the time domain thereof in order to successively excite ions excluding at least substantially all of the ions of interest according to the mass-to-charge ratio range thereof. A predetermined rate of change of the mass-to-charge ratio of the ions of interest during the duration of these broadband waveforms is employed. The phase $\phi(\omega_{min})$ is assigned a first discrete Fourier component having a first frequency ($f_i$) and a first time ($t_i$) of effective action. A second frequency ($f_j$) and a second time ($t_j$) of effective action is assigned to a subsequent second discrete Fourier component. The phase of the subsequent second discrete Fourier component is determined as shown in Equation 5.

Referring to FIGS. 4 and 7C–7F, a method of isolating ions of interest, such as a first group of ions, in the exemplary ITMS 9 includes producing ions with the ionizing mechanism 12; trapping the ions in the ion trap 13 by applying the RF trapping voltage V to the ring electrode 15; applying the broadband excitation waveform 84 to the pair of end-cap electrodes 20,22 with the CVR 82; employing the broadband excitation waveform 84 with a first broadband excitation waveform, such as 180; applying the first broadband excitation waveform in order to eject the ions excluding substantially all of the first group of ions and a second group of ions; and also employing the broadband excitation waveform 84 with a second broadband excitation waveform, such as 188 (or 196); and applying the second broadband excitation waveform in order to successively eject the second group of ions, according to the mass-to-charge ratios thereof, excluding substantially all of the first group of ions, thereby isolating the first group of ions in the ion trap 13. The range of mass-to-charge ratios of the second group of ions is about the one or more mass-to-charge ratios of the first group of ions. The first broadband excitation waveform 180 excites the ions excluding substantially all of the first and second groups of ions. These excluded ions have a range of mass-to-charge ratios which correspond, for example, to the frequency range of the plot 192 of FIG. 7D. The second broadband excitation waveform 188 (or 196) excites the second group of ions. The ions of interest have a range of mass-to-charge ratios which correspond to the frequency range of the gap 194 (or 200) of the plot 188 (or 196) of FIG. 7D (or FIG. 7F).

In FIG. 7F, ions having a mass-to-charge ratio less than the mass-to-charge ratio range of the ions of interest are excited with the first portion 203A of the broadband excitation waveform 196, and ions having a mass-to-charge ratio greater than the mass-to-charge ratio range of the ions of interest are excited with the second portion 203B of the waveform 196. Ions having successively smaller mass-to-charge ratios with respect to time are excited with the second portion 203B of the waveform 196. In FIG. 7D, ions having successively larger mass-to-charge ratios with respect to time are excited with the second portion 192B of the broadband excitation waveform 188.

Referring to FIGS. 4 and 7G–7H, another method of isolating ions of interest, in the exemplary ITMS 9 includes employing as the broadband excitation waveform 84 the broadband waveform 198 having excitation portions 204, 206,207. The excitation portions 204,206 excite ions excluding substantially all of the ions of interest and also excluding substantially all of a second group of ions having a range of mass-to-charge ratios about the mass-to-charge ratio range of the ions of interest. The excitation portion 207 excites the second group of ions which have a range of mass-to-charge ratios which generally correspond to the frequency range between points 210 and 212 of FIG. 7H. The ions of interest have a range of mass-to-charge ratios which correspond to the frequency range of the gap 208 of FIG. 7H. The excitation portions 204,206 are applied in order to eject the ions excluding substantially all of the first and second groups of ions. The excitation portion 207 is applied in order to sequentially eject the ions excluding substantially all of the first group of ions and, hence, isolate the first group of ions in the exemplary ion trap 13.

The excitation portion 207 has a first excitation sub-portion 207A, a second excitation sub-portion 207B, with the interruption gap 208 therebetween. The first excitation sub-portion 207A excites substantially all ions having a first mass-to-charge ratio range different from the mass-to-charge ratio range of the ions of interest. The second excitation sub-portion 207B excites substantially all ions having a second mass-to-charge ratio range different from the mass-to-charge ratio of the ions of interest and the first mass-to-charge ratio range. The interruption gap 208, or third sub-portion, generally does not excite the ions of interest. The time of duration of the exemplary interruption gap 208 is preferably chosen to be at least about equal to the time of relaxation of the ions of interest.

Figures 11A, 11B:
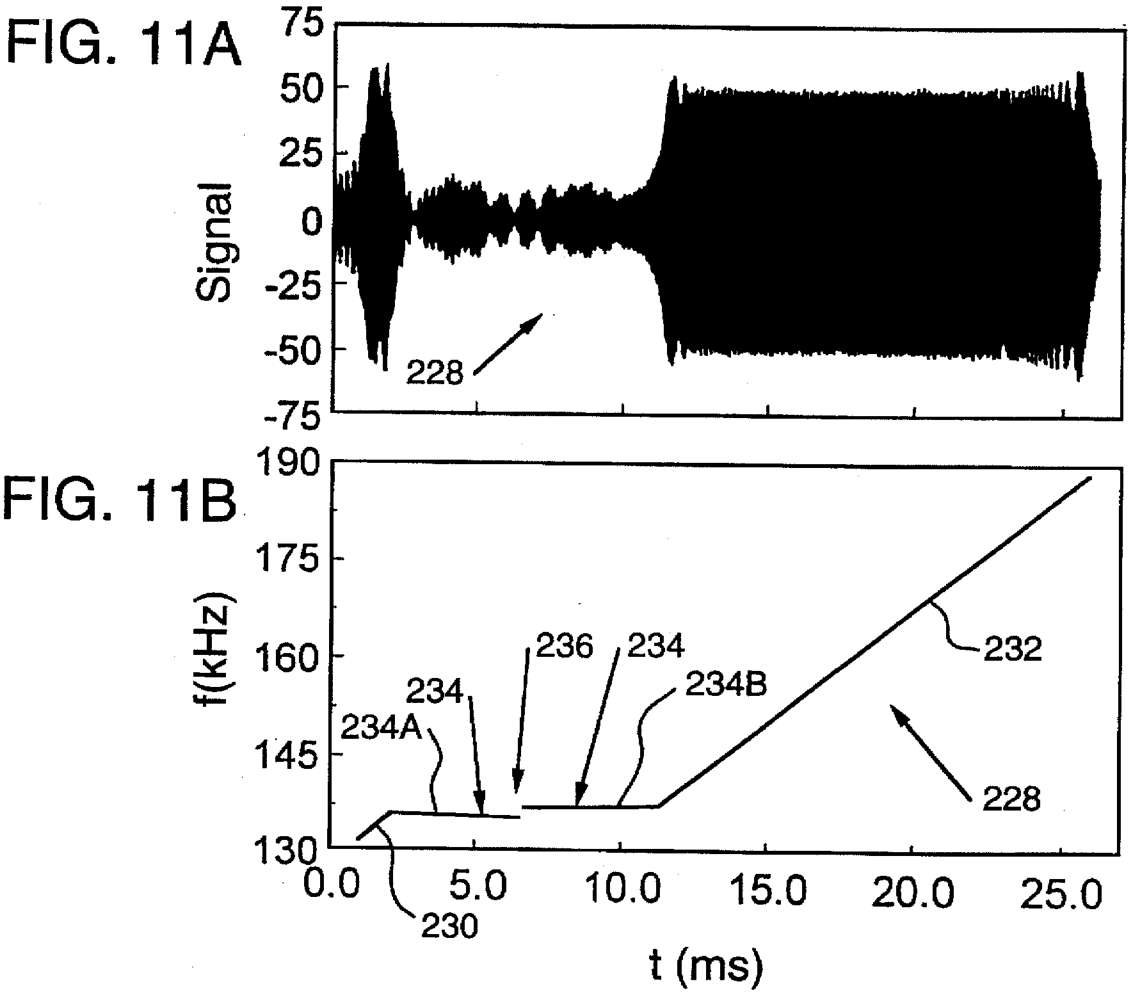
FIGS. 11A–11B (with the first plot being signal amplitude with respect to time and the second plot being frequency with respect to time) form a broadband waveform employable for the isolation of a single isotopic species in the practice of the present invention.

The exemplary first, second and third excitation portions 204,207,206 form the single broadband excitation waveform 198. As shown in FIGS. 7G–7H, this broadband waveform 198 may be employed one time or, as discussed below in connection with FIG. 8, a plurality of times. Although the exemplary excitation sub-portions 207A,207B of FIG. 7H are shown in a like manner as the portions 192A, 192B of the broadband waveform 188 of FIG. 7D, it will be appreciated that such excitation sub-portions 207A,207B may alternatively be employed in a like manner as the portions 203A,203B of the broadband waveform 196 of FIG. 7F (e.g., in a like manner as shown in FIG. 11B).

Figure 8:
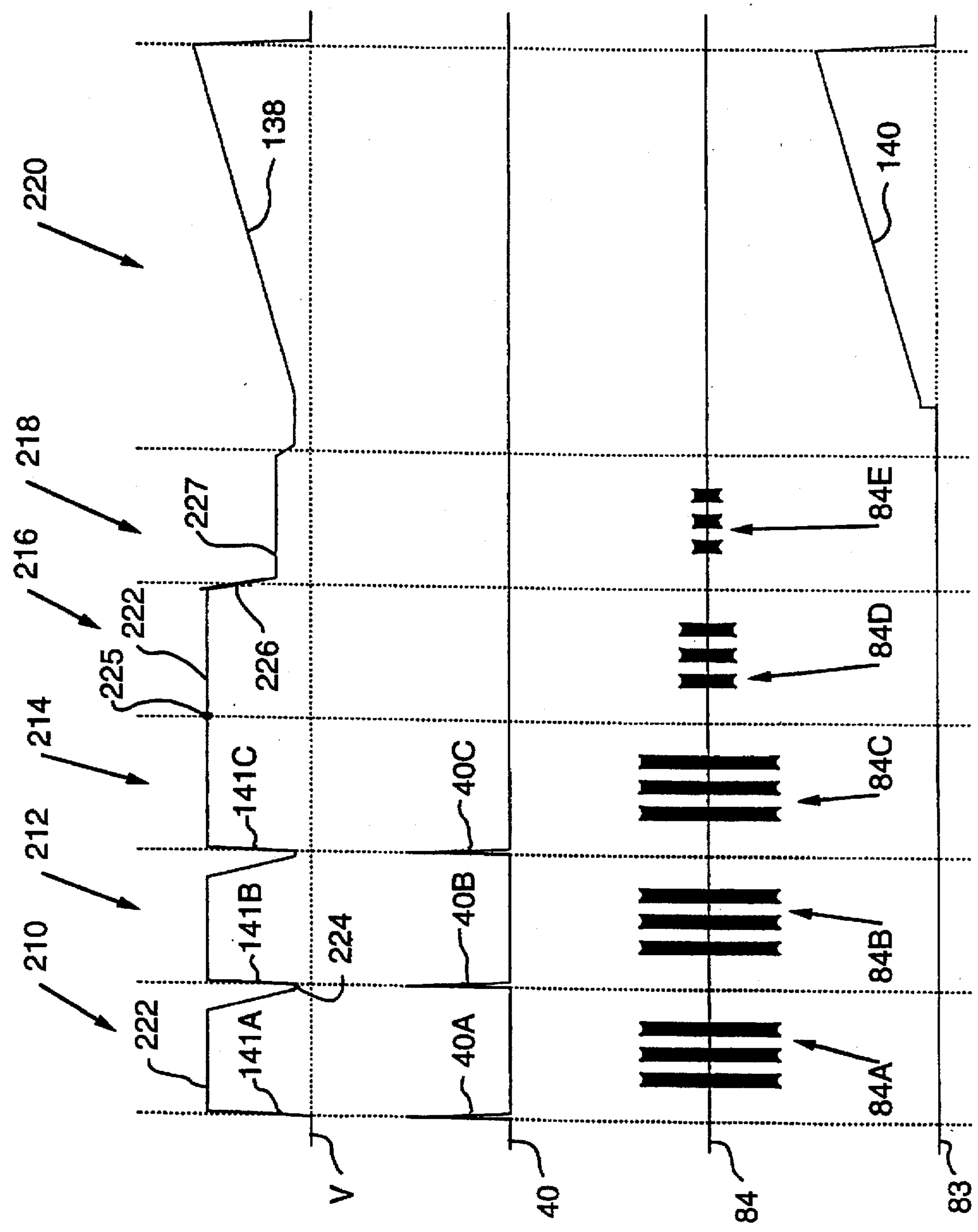
FIG. 8 is a plot for multiple laser shot experiments employing a ramped voltage method for trapping ions including three periods corresponding to trapping and mass selective accumulation of ions, a period corresponding to unit mass resolution ion isolation, a period corresponding to excitation and CID of remaining ions, and an analytical scan period.

Referring to FIG. 8, multiple laser shot experiments employing a ramped voltage method for trapping ions include three periods 210,212,214 corresponding to trapping and mass selective accumulation of ions; a period 216 corresponding to unit mass resolution ion isolation; a period 218 corresponding to excitation and CID of remaining ions; and an analytical scan period 220. The six periods 210,212, 214,216,218,220 are controlled by the software 156 of the PC 68 of FIG. 4.

Also referring to FIG. 4, each of the three periods 210, 212,214 begins by the PC 68 generating control signals to fire the laser 32. In a multishot mode of operation, the laser 32 is fired a preset number of times with a frequency of about 8 Hz (i.e., 125 ms between shots). Following each of the laser pulses 40A,40B,40C, the corresponding start pulse 128 on line 130 is used to initiate the respective voltage ramp 141A,141B,141C applied to the ring electrode 15 to a predefined trapping voltage, such as at voltage 222, for trapping ions using the ramped trapping voltage method. The broadband excitation waveform 84 may be applied one or more times with the trapping voltage in order to isolate the ions of interest and the group of ions in the vicinity thereof. The portions of the periods 210,212,214 after the respective laser pulses 40A,40B,40C enable cooling of the ions at maximum trapping voltage, during which normal broadband waveforms 84A,84B,84C, respectively, such as the broadband waveform 180 of FIGS. 7A–7B, may be applied for mass selective accumulation. Prior to the next laser pulse, such as the pulse 40B, the trapping voltage is reduced to about 10% of its maximum value, such as at voltage 224, to enable the next set of ions to penetrate the potential barrier in period 212. This multishot mode of operation produces additional ions in combination with some or all of the plural applications of the broadband excitation waveforms 84A,84B,84C. This increases the percentage of the ions of interest in the ion trap 13 before the start of period 216.

The stretched-in-time broadband excitation waveforms may be applied one or more times with the trapping voltage in order to isolate the ions of interest. For example, after the last laser pulse 40C, a stretched-in-time broadband waveform 84D, such as one of the broadband waveforms 188,196 of FIGS. 7C–7F, may be applied in period 216 for fine control of ion isolation. If CID spectra are to be obtained, the remaining ions may be excited using a stretched-in-time broadband waveform 84E applied during period 218.

Finally, in period 220, a conventional analytical scan, using the resonance ejection technique at an exemplary frequency of 140 kHz and an exemplary mass scan rate of 1000 Da/s, is employed to obtain the mass spectrum as discussed above in connection with the portion 138 of the trapping RF voltage of FIG. 3B and the portion 140 of the excitation voltage $v_s$ of FIG. 3C as controlled by the excitation signal 83 of FIG. 4 with sinusoidal excitation frequency $f_s$. In turn, mass spectra from the ion trap 13 are generally recorded by signal averaging the results from several scan cycles. The ratio of the amplitude of the excitation voltage $f_s$ applied between the end-cap electrodes 20,22 to the amplitude of the RF trapping voltage V on the ring electrode 15 is preferably generally constant during the analytical scan to obtain a linear calibration dependence between the trapping voltage and the masses of the ejected ions.

Referring to FIGS. 2 and 8, the dimensionless Mathieu parameter $q_z$ and the RF frequency ($F=\Omega/2\pi$) are operatively associated with the trapping RF voltage V. At transition 225, for example, at least some of these parameters $q_z$,F may be changed after the application of the normal broadband excitation waveform 84C and before the application of the stretched-in-time broadband excitation waveform 84D. At transition 226, for example, at least some of these parameters $q_z$,F are changed after the application of the waveform 84D and before the application of waveform 84E. This is best seen by the change in trapping voltage, such as from voltage 222 to voltage 227.

Figures 9A, 9B, 9C, 9D, 9E:
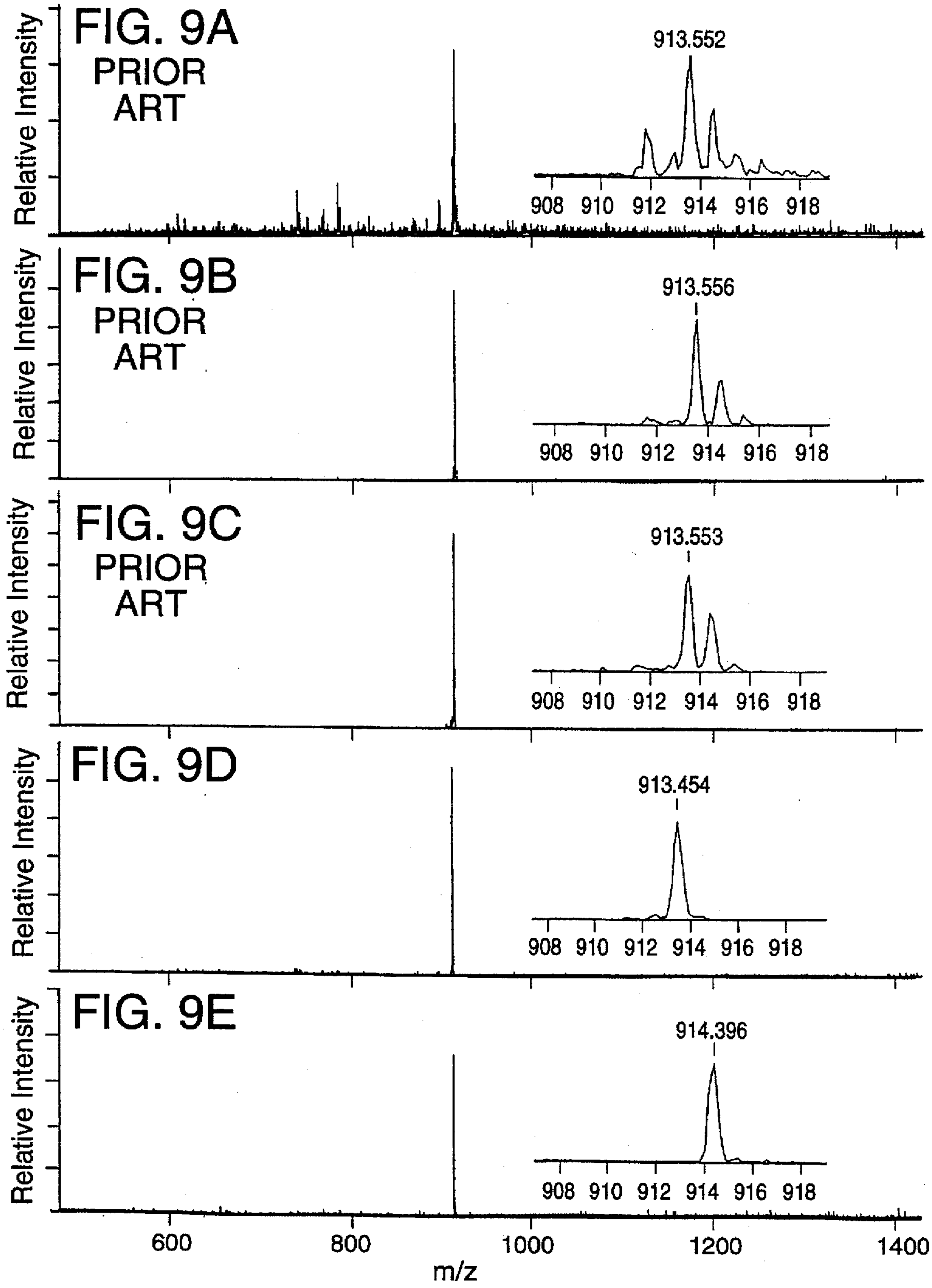
FIG. 9A PRIOR ART
FIG. 9B PRIOR ART
FIG. 9C PRIOR ART
FIG. 9A is a known MALDI mass spectrum, which includes an insert showing peak structure, before ion isolation.
FIGS. 9B–9C are known MALDI mass spectra, each of which includes an insert showing peak structure, observed following isolation with one or more normal notched broadband waveforms.
FIGS. 9D–9E are MALDI mass spectra, each of which includes an insert showing peak structure, observed following isolation with stretched-in-time notched broadband waveforms.

FIG. 9A is a known MALDI mass spectrum of α-Casein Fragment 90–96 (m/z=913.552 Da), which includes an insert showing peak structure, before ion isolation. FIGS. 9B and 9C are known MALDI mass spectra, each of which includes an insert showing peak structure, observed following isolation with: (B) a notched D-type waveform in a single laser shot ion isolation experiment; and (C) the same notched D-type waveform with three laser shots in the experiment, respectively.

FIGS. 9D–9E are MALDI mass spectra, each of which includes an insert showing peak structure, observed following isolation with stretched-in-time notched broadband waveforms in accordance with the present invention. Unit mass isolation may be successfully achieved by the application of stretched-in-time broadband waveforms (i.e., types a–e) as shown, for example, in FIG. 6B. To isolate the monoisotopic peak (m/z=913.454 Da as shown in FIG. 9D) from the protonated molecule cluster of α-Casein Fragment 90–96, three d-type stretched-in-time broadband waveforms of 4.7 (zero-to-peak) amplitude having a frequency range of 208.56–222.25 kHz (m/z=880–930 Da) with a notch within the frequency range 211.91–212.85 kHz (m/z=913.57–917.1 Da) are applied as discussed above in connection with period 216 of FIG. 8. Similarly, using these same broadband waveforms, with the notch shifted by about 1 Da, ions are successfully isolated corresponding to the second isotopic peak (m/z=914.396 as shown in FIG. 9E). These broadband waveforms for unit mass isolation are applied following mass selective ion accumulation from three laser shots per cycle as discussed above in connection with periods 210, 212,214 of FIG. 8.

An interesting feature is that the specified range of the ions of interest is usually larger than the actual mass window of the broadband excitation waveform. For example, a mass window of about 1 Da (as shown in FIG. 9D) is achieved with a notch width corresponding to about 3.5 Da. It is believed that the ions isolated within the mass window are excited, but to an extent that is too small to result in observable fragmentation by collisional dissociation, since few CID products are shown in FIGS. 9D and 9E. It will be appreciated that the broadband waveforms may be designed to isolate the ions of interest as a plurality of ions within a predetermined mass-to-charge ratio range, as shown in FIGS. 9A–9C or as a single isotopic species as shown in FIGS. 9D–9E.

Figure 10A:
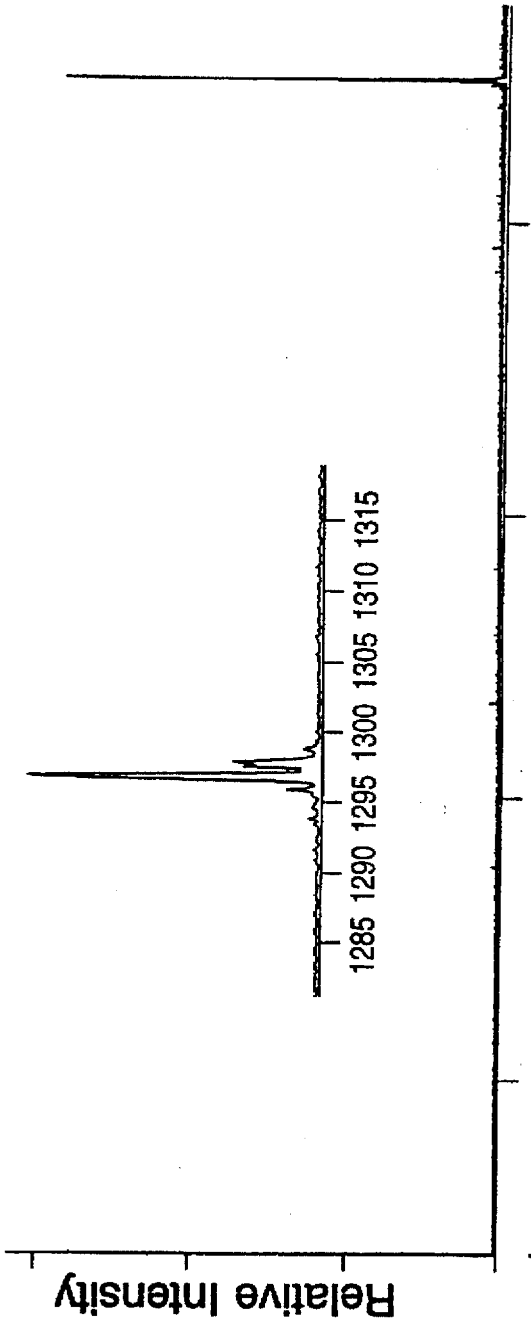
FIG. 10A PRIOR ART
FIG. 10A is a mass spectrum, which includes an insert showing peak structure, observed following isolation with normal notched broadband waveforms.

FIG. 10A is a mass spectrum, which includes an insert showing peak structure, observed following isolation of ions of Angiotensin I (m/z of about 1297 Da). The smallest mass isolation window, with no significant reduction in ion signal, is observed at about 2 Da using three E-type normal broadband waveforms of 20 V (zero-to-peak) amplitude having a notch within the frequency range of 144.47–144.94 kHz (m/z=1296.7–1300.7 Da).

Figure 10B:
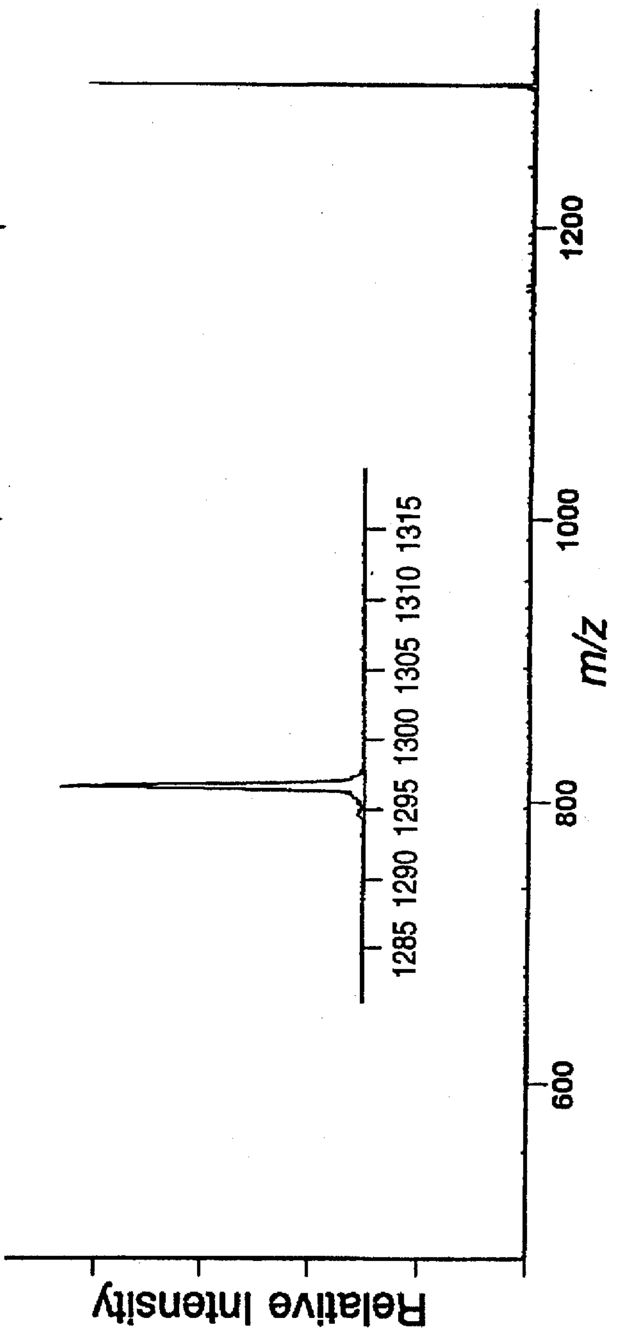
FIG. 10B is a mass spectrum, which includes an insert showing peak structure, observed following isolation with stretched-in-time notched broadband waveforms.

FIG. 10B is a mass spectrum, which includes an insert showing peak structure, observed following isolation with three d-type stretched-in-time broadband waveforms of 3.1 V (zero-to-peak) amplitude. The broadband waveform frequency range is 143.19–147.35 kHz (m/z=1280–1315 Da) with a notch within the range of 144.87–145.31 kHz (m/z=1296.9–1300.6 Da). In this case, D-type normal broadband waveforms are first applied for preliminary isolation of the ion cluster as discussed above in connection with periods 210,212,214 of FIG. 8. In this case, unit mass isolation may be obtained with either d-type or d-type stretched-in-time broadband waveforms applied for ion ejection; however, the amplitude required for d-type broadband waveforms is less than that for d-type broadband waveforms.

FIGS. 11A–11B illustrate a broadband waveform 228 employable for the isolation of a single isotopic species in the practice of the present invention. The possibility of unit mass isolation in a single-step procedure is illustrated using the waveform 228 which is designed for: (1) quick coarse removal of ions having a mass-to-charge ratio far from that of the ions of interest; and (2) precise fine ejection of other unwanted ions in the vicinity of the ions of interest. The waveform 228 employs a relatively fast mass scan rate in portions 230,232, and a relatively slow mass scan rate in portion 234 for the respective ejection of the former and latter ions. A frequency gap 236 is disposed between sub-portions 234A,234B of portion 234.

Figure 12A:
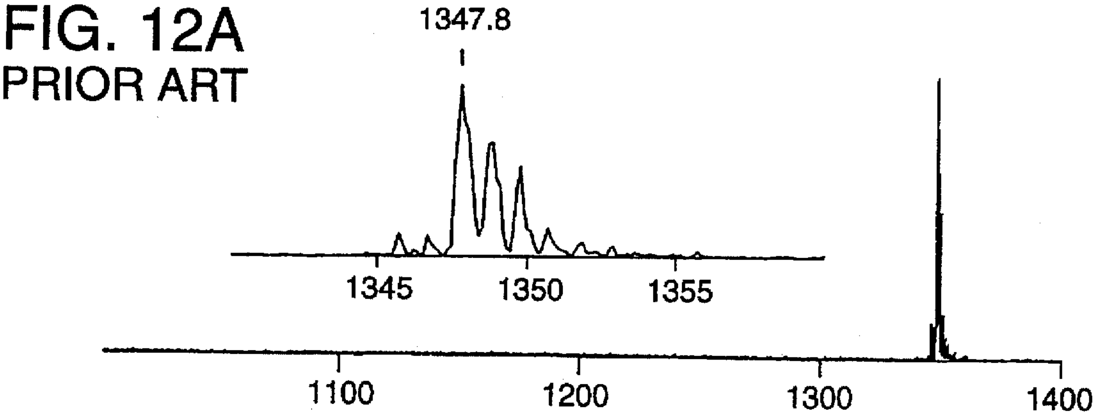
FIG. 12A PRIOR ART
FIG. 12A is a known mass spectrum, including an insert showing peak structure, using a conventional SWIFT technique.

The exemplary broadband waveform 228 is used for isolation of the isotopic forms of the protonated molecules of Substance P (m/z=1347.8 Da) as shown in FIG. 12A. The frequency range of the broadband waveform 228 corresponds to an m/z range of about 1000 to 1400 Da, with such m/z range being limited because of the limited dynamic range of the exemplary WS 77 of FIG. 4. The broadband waveform 228 is sampled in an order which corresponds to the ejection of relatively high mass ions at the beginning (i.e., portion 230 and sub-portion 234A) of the broadband waveform 228 and ejection of relatively low mass ions at the end (i.e., sub-portion 234B and portion 232) of such waveform 228. The mass scan rate is relatively high at the portions 230,232 of the waveform 228. At the middle portion 234, the ejection process is similar to that discussed above in connection with FIGS. 7F and 7H, although there is no directly corresponding interruption gap in the generation of the broadband waveform 228. Instead, the relaxation of the kinetic energy of the ions of interest takes place due to the switch of the frequency sweep direction, at frequency gap 236, which is near the frequency corresponding to the ions of interest.

Sub-portion 234A excites ions having a mass-to-charge ratio greater than the mass-to-charge ratio of the ions of interest, and sub-portion 234B excites ions having a mass-to-charge ratio less than the mass-to-charge ratio of the ions of interest. Sub-portion 234B successively excites ions having smaller mass-to-charge ratios and sub-portion 234A successively excites ions having greater mass-to-charge ratios. In terms of having relatively high mass ions with respect to the ions of interest, the sub-portion 234A corresponds to the second portion 203B of FIG. 7F and, in terms of having relatively low mass ions with respect to the ions of interest, the sub-portion 234B corresponds to the first portion 203A of FIG. 7F. In terms of having a negative mass scan rate, the sub-portion 234B corresponds to the second portion 203B of FIG. 7F and, in terms of having a positive mass scan rate, the sub-portion 234A corresponds to the first portion 203A of FIG. 7F. In terms of achieving ion isolation in a single step, the broadband waveform 228 resembles the broadband waveform 198 discussed above in connection with FIGS. 7G–7H.

Figure 12B:
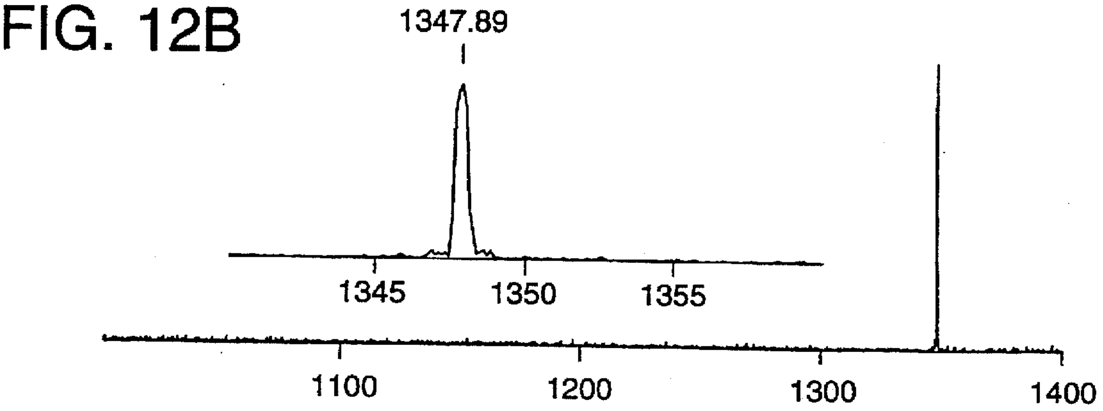
FIGS. 12B–12D are mass spectra, each of which includes an insert showing peak structure, observed following isolation with the broadband waveform of FIGS. 11A–11B.
Figure 12C:
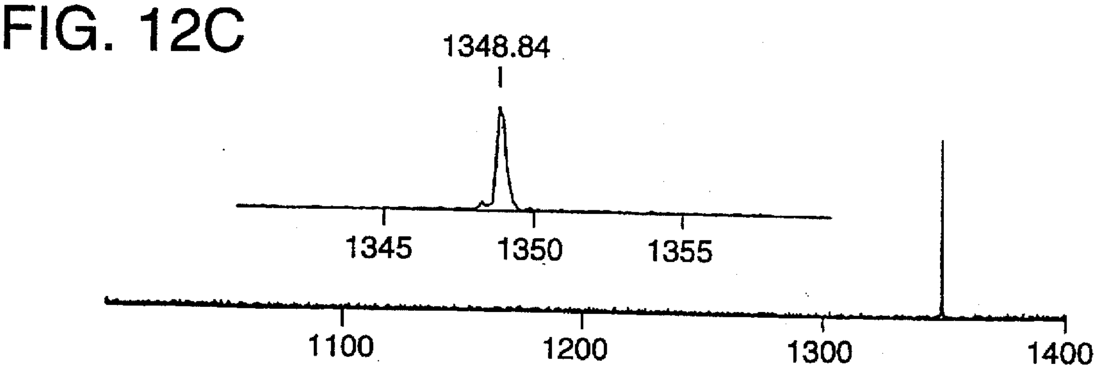
Figure 12D:
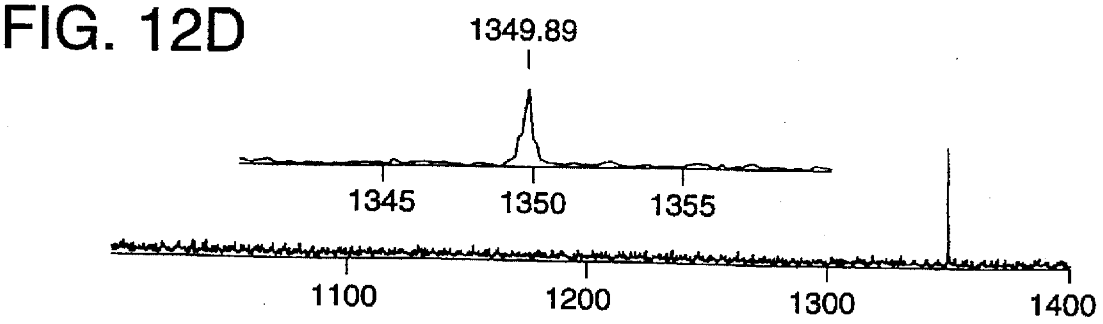

FIG. 12A is a known mass spectrum of Substance P (m/z=1347.8 Da), including an insert showing peak structure, using a conventional SWIFT technique. The results for the isolation of one of three single isotopic species of Substance P at about $q_z$=0.34 using the broadband excitation waveform 228 of FIGS. 11A–11B is shown in FIG. 12B. The three peaks of the isotopic cluster of FIG. 12A demonstrate the limited capabilities of the normal broadband waveform designed according to the conventional SWIFT method. The frequency notch or gap 236 of the broadband waveform 228 of FIGS. 11A–11B is chosen to leave only the major isotopic form of FIG. 12B in the ion trap 13 of FIG. 4. Different isotopic species may be isolated, as shown with the other two peaks of the isotopic cluster of FIG. 12A, by a relatively small shifting of the trapping voltage on the ring electrode 15.

The exemplary embodiments, discussed above in connection with FIGS. 7C–7H and 11A–11B, disclose an excitation voltage employing at least one broadband excitation waveform having at least two excitation portions, with a first excitation portion exciting ions excluding substantially all of the ions of interest having at least one mass-to-charge ratio and also excluding substantially all of a second group of ions having a range of mass-to-charge ratios about the mass-to-charge ratio of the ions of interest, and a second excitation portion exciting the second group of ions in order to successively eject the second group of ions, according to the mass-to-charge ratios thereof, excluding substantially all of the first group of ions, thereby isolating the first group of ions in the ion trap 13 of FIG. 4.

The present invention substantially increases the applications of the quadrupole ion trap for large molecule analysis in fields such as biochemistry, protein chemistry, immunology and molecular biology in order to elucidate the structures and sequences of biomolecules. In particular, accurate molecular weights of peptides using MS measurements enable the determination of the tryptic fragments from a protein in order to establish its identity from a database, to reveal point mutations or post-translational modifications, or to compare recombinant proteins with native proteins. Additionally, MS/MS measurements provide amino acid sequences that, for example, characterize the structure of peptide antigens displayed on cell surfaces for recognition by T-cells. Knowledge of such structures enables the development of vaccine strategies directed against tumor cells utilizing the body's own immune system.

The high resolution isolation of ions achieved is due to the fact that the ejection of ions from the ion trap is not simultaneous when using the disclosed phase modulation of the broadband excitation waveforms. The excitation power for a particular ion at a particular point in time is concentrated by choosing suitable phase modulation functions. In the disclosed method, ions are ejected from the ion trap successively, and the isolation resolution is controlled by changing the mass scan rate. Unit mass resolution for ion isolation in the range of m/z up to about 1300–1600 Da is obtained with the exemplary, relatively narrow frequency range, stretched-in-time broadband excitation waveforms.

Whereas particular embodiments of the present invention have been described above for purposes of illustration, it will be appreciated by those skilled in the art that numerous variations in the details may be made without departing from the invention as described in the appended claims.

We claim:

1. A method of isolating a first group of ions having at least one mass-to-charge ratio in an ion trap having a ring electrode and a pair of end-cap electrodes comprising producing ions from a plurality of atoms or molecules, trapping the ions in the ion trap by applying a trapping voltage to said ring electrode, applying an excitation voltage to said pair of end-cap electrodes, employing as said excitation voltage a first excitation waveform and a second excitation waveform, with the first excitation waveform exciting the ions excluding substantially all of said first group of ions and also excluding substantially all of a second group of ions having a range of mass-to-charge ratios about said at least one mass-to-charge ratio of said first group of ions, and the second excitation waveform exciting said second group of ions, applying the first excitation waveform in order to eject the ions excluding substantially all of said first and second groups of ions, and applying the second excitation waveform in order to successively eject said second group of ions, according to the mass-to-charge ratios thereof, excluding substantially all of said first group of ions, thereby isolating said first group of ions in the ion trap.

2. The method of claim 1 including employing broadband waveforms as the first and second excitation waveforms.

3. The method of claim 1 including employing as said first group of ions a single isotopic species.

4. The method of claim 1 including employing as said first group of ions a plurality of ions within a predetermined mass-to-charge ratio range.

5. The method of claim 1 including employing the second excitation waveform with a first portion and a second portion, with the first portion exciting substantially all ions having a first mass-to-charge ratio range different from said at least one mass-to-charge ratio of said first group of ions, and the second portion exciting substantially all ions having a second mass-to-charge ratio range different from said at least one mass-to-charge ratio of said first group of ions and said first mass-to-charge ratio range.

6. The method of claim 5 including successively exciting ions of different mass-to-charge ratios in the first and second portions of the second excitation waveform.

7. The method of claim 5 including employing a third portion between the first and second portions of the second excitation waveform, with the third portion generally not exciting said first group of ions.

8. The method of claim 7 including employing molecules of a buffer gas in the ion trap, with the buffer gas molecules colliding with said first group of ions, employing said first group of ions which have a time of relaxation of kinetic energy associated with collisions with the buffer gas molecules, and employing the third portion of the second excitation waveform with a time of duration at least about equal to said time of relaxation.

9. The method of claim 5 including exciting ions having a mass-to-charge ratio less than said at least one mass-to-charge ratio of said first group of ions with the first portion of the second excitation waveform, and exciting ions having a mass-to-charge ratio greater than said at least one mass-to-charge ratio of said first group of ions with the second portion of the second excitation waveform.

10. The method of claim 9 including successively exciting ions having greater mass-to-charge ratios with the second portion of the second excitation waveform.

11. The method of claim 9 including successively exciting ions having smaller mass-to-charge ratios with the second portion of the second excitation waveform.

12. The method of claim 5 including exciting ions having a mass-to-charge ratio greater than said at least one mass-to-charge ratio of said first group of ions with the first portion of the second excitation waveform, and exciting ions having a mass-to-charge ratio less than said at least one mass-to-charge ratio of said first group of ions with the second portion of the second excitation waveform.

13. The method of claim 12 including successively exciting ions having greater mass-to-charge ratios with the second portion of the second excitation waveform.

14. The method of claim 12 including successively exciting ions having smaller mass-to-charge ratios with the second portion of the second excitation waveform.

15. The method of claim 1 including applying the first excitation waveform a plurality of times with the trapping voltage in order to isolate said first and second groups of ions.

16. The method of claim 15 including producing additional ions from a plurality of atoms or molecules in combination with at least some of said plural applications of the first excitation waveform.

17. The method of claim 1 including applying the second excitation waveform a plurality of times with the trapping voltage in order to isolate said first group of ions.

18. The method of claim 1 including controlling a first rate of change of a mass-to-charge ratio of ions ejected from the ion trap with the first excitation waveform, and controlling a second different rate of change of the mass-to-charge ratio of ions ejected from the ion trap with the second excitation waveform.

19. The method of claim 18 including employing the first rate of change which is greater than the second rate of change.

20. The method of claim 1 including employing a bipolar excitation voltage, and employing a dipole field operatively associated with said bipolar excitation voltage.

21. The method of claim 1 including employing parameters operatively associated with said trapping voltage, and changing at least one of said parameters after application of the first excitation waveform.

22. The method of claim 21 including changing said at least one of said parameters before application of the second excitation waveform.

23. The method of claim 1 including employing an inverse Fourier transform to design at least one of the first and second excitation waveforms with the inverse Fourier transform.

24. The method of claim 23 including employing a frequency domain with said at least one of the first and second excitation waveforms, and employing a spectral distribution of magnitude of discrete Fourier components in the frequency domain of said at least one of the first and second excitation waveforms in order to excite ions excluding at least substantially all of said first group of ions.

25. The method of claim 23 including employing a time domain and a duration with said at least one of the first and second excitation waveforms, and employing a plurality of times ($t_i$) of effective action of a plurality of discrete Fourier components in the time domain of said at least one of the first and second excitation waveforms in order to successively excite ions excluding at least substantially all of said first group of ions according to a mass-to-charge ratio thereof with a predetermined rate of change of said mass-to-charge ratio thereof during the duration of said at least one of the first and second excitation waveforms.

26. The method of claim 25 including employing i and j as integers, with j being greater than i, employing a first frequency ($f_i$) with a first one of said discrete Fourier components, assigning a first phase to the first discrete Fourier component, employing a second frequency ($f_j$) and a second time ($t_j$) of effective action with a subsequent second discrete Fourier component, and determining a phase of the subsequent second discrete Fourier component as a sum of the first phase plus:

$$2\pi t_j(f_j - f_i)$$

27. The method of claim 1 including producing the ions by matrix-assisted laser desorption/ionization (MALDI).

28. The method of claim 1 including employing the ion trap in a resonance ejection mode, scanning the trapping voltage in order to sequentially eject said first group of ions, and determining a ratio of mass-to-charge of said first group of ions.

29. A method of isolating a first group of ions having at least one mass-to-charge ratio in an ion trap having a ring electrode and a pair of end-cap electrodes comprising producing ions from a plurality of atoms or molecules, trapping the ions in the ion trap by applying a trapping voltage to said ring electrode, applying an excitation voltage to said pair of end-cap electrodes, employing as said excitation voltage a broadband excitation waveform having first, second, and third excitation portions, with the first and third excitation portions exciting the ions excluding substantially all of said first group of ions and also excluding substantially all of a second group of ions having a range of mass-to-charge ratios about said at least one mass-to-charge ratio of said first group of ions, and the second excitation portion exciting said second group of ions, applying the first and third excitation portions in order to eject the ions excluding substantially all of said first and second groups of ions, and applying the second excitation portion in order to sequentially eject the ions excluding substantially all of said first group of ions, thereby isolating said first group of ions in the ion trap.

30. The method of claim 29 including successively employing said first, second and third portions of said excitation waveform as a single excitation waveform.

31. The method of claim 30 including employing said single excitation waveform one time.

32. The method of claim 30 including employing said single excitation waveform a plurality of times.

33. The method of claim 30 including employing an inverse Fourier transform to design said single excitation waveform with the inverse Fourier transform.

34. The method of claim 33 including employing a frequency domain with said single excitation waveform, and employing a spectral distribution of magnitude of discrete Fourier components in the frequency domain of said single excitation waveform in order to excite ions excluding at least substantially all of said first group of ions.

35. The method of claim 33 including employing a time domain and a duration with said single excitation waveform, and employing a plurality of times ($t_i$) of effective action of a plurality of discrete Fourier components in the time domain of said single excitation waveform in order to successively excite ions excluding at least substantially all of said first group of ions according to a mass-to-charge ratio thereof with a predetermined rate of change of said mass-to-charge ratio thereof during the duration of said single excitation waveform.

36. The method of claim 35 including employing i and j as integers, with j being greater than i, employing a first frequency ($f_i$) with a first one of said discrete Fourier components, assigning a first phase to the first discrete Fourier component, employing a second frequency ($f_j$) and a second time ($t_j$) of effective action with a subsequent second discrete Fourier component, and determining a phase of the subsequent second discrete Fourier component as a sum of the first phase plus:

$$2\pi t_f(f_f - f_i)$$

37. The method of claim 29 including controlling a first rate of change of a mass-to-charge ratio of ions ejected from the ion trap with the first and third excitation portions, and controlling a second different rate of change of the mass-to-charge ratio of ions ejected from the ion trap with the second excitation portion.

38. The method of claim 29 including employing as said first group of ions a single isotopic species.

39. The method of claim 29 including employing as said first group of ions a plurality of ions within a predetermined mass-to-charge ratio range.

40. The method of claim 29 including employing the second excitation portion of said excitation waveform with a first excitation sub-portion and a second excitation sub-portion, with the first excitation sub-portion exciting substantially all ions having a first mass-to-charge ratio range different from said at least one mass-to-charge ratio of said first group of ions, and the second excitation sub-portion exciting substantially all ions having a second mass-to-charge ratio range different from said at least one mass-to-charge ratio of said first group of ions and said first mass-to-charge ratio range.

41. The method of claim 40 including employing a third sub-portion between the first and second excitation sub-portions of the second excitation portion of said excitation waveform, with the third sub-portion generally not exciting said first group of ions.

42. The method of claim 41 including employing molecules of a buffer gas in the ion trap, with the buffer gas molecules colliding with said first group of ions, employing said first group of ions which have a time of relaxation of kinetic energy associated with collisions with the buffer gas molecules, and employing the third sub-portion of said excitation waveform with a time of duration at least about equal to said time of relaxation.

43. Ion trap mass spectrometer apparatus comprising ionizing means for producing ions from a plurality of atoms or molecules, trapping means for trapping the produced ions, separating means for separating the trapped ions according to a ratio of mass-to-charge thereof, said separating means including a ring electrode and a pair of end-cap electrodes, and control means including applying means for applying a trapping voltage to the ring electrode and for applying an excitation voltage to the end-cap electrodes, said applying means including means for applying said excitation voltage as at least one excitation waveform having at least two excitation portions, with a first excitation portion exciting the ions excluding substantially all of a first group of ions having at least one mass-to-charge ratio and also excluding substantially all of a second group of ions having a range of mass-to-charge ratios about said at least one mass-to-charge ratio of said first group of ions in order to eject the ions excluding substantially all of said first and second groups of ions, and a second excitation portion exciting said second group of ions in order to successively eject said second group of ions, according to the mass-to-charge ratios thereof, excluding substantially all of said first group of ions, thereby isolating said first group of ions in said trapping means.

44. The apparatus of claim 43 including said control means further includes means for scanning the trapping voltage in order to sequentially eject said first group of ions, and determining means for determining said at least one mass-to-charge ratio of said first group of ions.

45. The apparatus of claim 43 including said applying means further includes means for applying the first excitation portion a plurality of times with the trapping voltage in order to isolate said first and second groups of ions.

46. The apparatus of claim 43 including said applying means further includes means for applying the second excitation portion a plurality of times with the trapping voltage in order to isolate said first group of ions.

47. The apparatus of claim 43 including said control means further includes means for controlling a first rate of change of a mass-to-charge ratio of ions ejected from said trapping means with the first excitation portion, and means for controlling a second different rate of change of the mass-to-charge ratio of ions ejected from said trapping means with the second excitation portion.

48. The apparatus of claim 43 including said at least one excitation waveform is at least two excitation waveforms, and said control means further includes means for controlling said trapping voltage with at least one parameter operatively associated therewith, and means for changing said at least one parameter after application of the first excitation waveform.

49. The apparatus of claim 48 including said control means further includes means for changing said at least one parameter before application of the second excitation waveform.

50. The apparatus of claim 43 including said at least one excitation waveform is two excitation waveforms, and said control means further includes means for controlling a mass scan rate of the first excitation waveform and means for controlling a mass scan rate of the second excitation waveform.

51. The apparatus of claim 50 including said means for controlling the mass scan rate of the first excitation waveform controlling a positive mass scan rate of the first excitation waveform.

52. The apparatus of claim 50 including said means for controlling the mass scan rate of the first excitation waveform controlling a negative mass scan rate of the first excitation waveform.

53. The apparatus of claim 50 including said means for controlling the mass scan rate of the second excitation waveform controlling at least one of a negative mass scan rate and a positive mass scan rate of the second excitation waveform.

54. The apparatus of claim 43 including said at least one excitation waveform includes first, second and third excitation portions, with the second excitation portion having a first excitation sub-portion, a second excitation sub-portion, and a third sub-portion therebetween, and the third sub-portion generally not exciting said first group of ions.

55. The apparatus of claim 54 including said at least one excitation waveform includes a frequency domain, and the third sub-portion is a gap in the frequency domain.

56. The apparatus of claim 54 including said at least one excitation waveform includes a time domain, and the third sub-portion is a gap in the time domain.

57. Ion trap mass spectrometer apparatus comprising ionizing means for producing ions from a plurality of atoms or molecules, trapping means for trapping the produced ions, separating means for separating the trapped ions according to a ratio of mass-to-charge thereof, said separating means including a ring electrode and a pair of end-cap electrodes, and applying means for applying a trapping voltage to the ring electrode and for applying an excitation voltage to the end-cap electrodes, said applying means including means for applying a first excitation waveform and means for applying a second excitation waveform, with the first excitation waveform exciting the ions excluding substantially all of a first group of ions having at least one mass-to-charge ratio and also excluding substantially all of a second group of ions having a range of mass-to-charge ratios about said at least one mass-to-charge ratio of said first group of ions in order to eject the ions excluding substantially all of said first and second groups of ions, and the second excitation waveform exciting said second group of ions in order to successively eject said second group of ions, according to the mass-to-charge ratios thereof, excluding substantially all of said first group of ions, thereby isolating said first group of ions in said trapping means.

58. The apparatus of claim 57 including said applying means further includes means for controlling a first rate of change of a mass-to-charge ratio of ions ejected from said trapping means with the first excitation waveform, and means for controlling a second different rate of change of the mass-to-charge ratio of ions ejected from said trapping means with the second excitation waveform.

59. Ion trap mass spectrometer apparatus comprising ionizing means for producing ions from a plurality of atoms or molecules, trapping means for trapping the produced ions, separating means for separating the trapped ions according to a ratio of mass-to-charge thereof, said separating means including a ring electrode and a pair of end-cap electrodes, and applying means for applying a trapping voltage to the ring electrode and for applying an excitation voltage to the end-cap electrodes, said applying means including means for applying said excitation voltage as a broadband excitation waveform having first, second, and third excitation portions, with the first and third excitation portions exciting the ions excluding substantially all of a first group of ions having at least one mass-to-charge ratio and also excluding substantially all of a second group of ions having a range of mass-to-charge ratios about said at least one mass-to-charge ratio of said first group of ions in order to eject the ions excluding substantially all of said first and second groups of ions, and the second excitation portion exciting said second group of ions in order to sequentially eject the ions excluding substantially all of said first group of ions, thereby isolating said first group of ions in said trapping means.

60. The apparatus of claim 59 including said trapping means includes ion trap means having buffer gas molecules therein, with the buffer gas molecules colliding with said first group of ions, said first group of ions have a time of relaxation of kinetic energy associated with collisions with the buffer gas molecules, and said applying means further includes means for applying the second excitation portion of said excitation waveform with a notch having a duration at least about equal to said time of relaxation.

* * * * *

UNITED STATES PATENT AND TRADEMARK OFFICE

CERTIFICATE OF CORRECTION

PATENT NO. : 5,696,376

DATED : December 9, 1997

INVENTOR(S) : Vladimir M. Doroshenko and Robert J. Cotter

It is certified that error appears in the above-indentified patent and that said Letters Patent is hereby corrected as shown below:

Column 13, line 58, "dam" should be --data--.

Column 15, line 10, "3is" should be --3 is--.

Column 22, line 10, "$f_s$" should be --$V_s$--.

Column 22, line 46 (second occurrence), "d-type" should be --d-type--.

Column 23, line 24, "d-type" should be --d-type--.

Column 23, line 27, "d-type" should be --d-type--.

Signed and Sealed this

Twenty-fifth Day of August, 1998

Attest:

BRUCE LEHMAN

Attesting Officer

*Commissioner of Patents and Trademarks*

UNITED STATES PATENT AND TRADEMARK OFFICE

CERTIFICATE OF CORRECTION

PATENT NO. : 5,696,376

DATED : December 9, 1997

INVENTOR(S) : Vladimir M. Doroshenko et al.

It is certified that error appears in the above-identified patent and that said Letters Patent is hereby corrected as shown below:

On the Title Page, first column, after the title, the following should be inserted:

--Government Support: This invention was made with government support under Grant # R01 RR08912-01 awarded by the National Institutes of Health. The government has certain rights in the invention.--

Signed and Sealed this

Fourth Day of May, 1999

Attest:

Q. TODD DICKINSON

*Attesting Officer*

*Acting Commissioner of Patents and Trademarks*